US006182014B1

(12) United States Patent
Kenyon et al.

(10) Patent No.: US 6,182,014 B1
(45) Date of Patent: Jan. 30, 2001

(54) METHOD AND SYSTEM FOR OPTIMIZING LOGISTICAL OPERATIONS IN LAND SEISMIC SURVEYS

(75) Inventors: Astrid S. Kenyon, Cedar Park; Douglas J. Morrice, Austin, both of TX (US)

(73) Assignee: Schlumberger Technology Corporation, Austin, TX (US)

( * ) Notice: Under 35 U.S.C. 154(b), the term of this patent shall be extended for 0 days.

(21) Appl. No.: 09/196,796

(22) Filed: Nov. 20, 1998

(51) Int. Cl.[7] ...................................................... G06F 19/00
(52) U.S. Cl. ............................................................. 702/14
(58) Field of Search .................................. 705/7, 8, 9, 11; 702/6, 14

(56) References Cited

PUBLICATIONS

Current, J. R. and D. A. Schilling. 1994. The Median Tour and Maximal Covering Tour Problems: Formulations and Heuristics. *European Journal of Operational Research*, 73, 114–126.
Current, J. R. and D. A. Schilling. 1989. The Covering Salesman Problem. *Transportation Science*, 23, 2, 208–213.
Gendreau, M., G. Laporte, and F. Semet. 1997. The Covering Tour Problem. *Operations Research*, 45, 4, 568–576.
Labbe, M. and G. Laporte. 1986. Maximizing User Convenience and Postal Service Efficiency in Post Box Location. *Belgian Journal of Operations Research, Statistics, and Computer Science* 26, 2, 24–33.
Laporte, G. 1988. Location–Routing Problems. *Vehicle Routing: Methods and Studies*. B. L. Golden and A. A. Assad, eds. North–Holland, Amsterdam.
Liner, C. L., R. Gobeli, and W. D. Underwood. 1998. 3–D Seismic Survey Design as an Optimization Problem. In Proceedings of the SEG 1998 International Expositions and 68th Annual Meeting. Society of Exploration Geophysicists, Tulsa, Oklahoma.
Revelle, C. and G. Laporte. 1993. New Directions in Plant Location. *Journal in Locational Analysis* 5, 31–58.
Rote. G. 1992. The N–line Traveling Salesman Problem. *Networks* 22, 91–108.

*Primary Examiner*—Donald E. McElheny, Jr.
(74) *Attorney, Agent, or Firm*—Gail M. Taylor-Russell; Pehr B. Jansson

(57) ABSTRACT

A system and method for optimizing logistical operations in land seismic surveys. The system and method for modeling and optimizing logistical operations problems in land seismic survey operations is implemented in a computer program running on a computer processor. A logistical problem is formulated with a set of decision variables and problem data and the problem is modeled as an objective function and a set of constraints, expressed in terms of the problem data and the decision variables. The objective function is solved subject to the constraints and an optimal solution is generated for the set of decision variables to optimize the logistical problem. Logistical problems that may be optimized using this approach include: minimization of total costs in the design and operations of a land seismic survey, routing of one or more source crews through a sequence of source location points, placement of recording stations in a survey, placement of source locations, source crew and vehicle routing, offsetting source locations from exclusion zones to avoid obstacles and determining the optimal amount of an expendable resource needed for the survey.

39 Claims, 19 Drawing Sheets

METHOD AND SYSTEM FOR OPTIMIZING LOGISTICAL OPERATIONS IN LAND SEISMIC SURVEYS

BACKGROUND

This invention relates generally to solving logistical operations problems in three dimensional (3D) land seismic surveys. More particularly, the invention is a method and system for optimizing seismic surveys by applying operations research methodologies to the land seismic surveying problem domain. Optimization problems in 3D land seismic surveying are formulated and solved using mathematical programming techniques. The invention introduces a number of optimization models and methods for improving logistical operations in 3D land seismic surveys. The present method and system models logistical problems by formulating the problem as a set of inequalities and then solving the set of inequalities using an optimization software program using mathematical programming techniques.

Seismic surveying is a key technology area in geophysical prospecting. Seismic surveying is primarily concerned with reflection seismology. A source on the surface of the earth generates a signal which propagates through the earth. The underground geological structures attenuate, reflect, and refract the signal. Receiver equipment on the earth's surface monitors the reflected wave. Using this and other information, seismologists construct a picture of the earth's subsurface.

Over the years, increasingly sophisticated survey designs and data processing techniques have been developed. More sophisticated designs have led to more complex logistical operations in conducting seismic surveys. For example, until the early 1980's, most land seismic surveys were two dimensional (2D) surveys conducted along a single line of source and receiver points. Today, most surveys are three dimensional (3D) where source and receivers points are scattered on a plane and the arrangement of the source and receiver points is defined by the requirements of the survey.

The requirements of seismic surveying can be subdivided into two categories: geophysical and logistical. A great deal of the formal research has focused on improving the geophysical aspect of seismic surveys. The geophysical aspect involves achieving the best possible signal to construct the best possible picture of the earth's subsurface. Many improvements have been made in seismic signal source generation and receiver detection technology. In seismic surveying, a signal is generated from a source point, follows along a ray path, and is reflected off an underground target level. The reflected path returns to a receiver point. The reflected signal provides information on the underground structure such as a subsurface layer. The point of reflection of the underground target between the source and receiver is called the common midpoint (CMP). In seismic surveying, several receivers are turned on to detect the signal sent out from a single source point. This permits the simultaneous sampling of several CMPS. If the process is repeated with several sources instead of one source, then the same CMPs get sampled several times. Sampling on the same point improves the signal-to-noise ratio (S/N) for the processing of the data and results in better signal strength, which gives a better picture of the earth's subsurface.

Much less emphasis has been placed on logistical operations and on techniques for improving those operations. The logistical aspect relates to the handling of the details of the seismic surveying operation along with any other factors besides geophysical ones that affect survey results. Among the many factors that influence the logistics of a survey are size of the survey, design of the survey, the amount of equipment available, and the number of crews available. These factors are controllable. Other factors that affect the survey results such as weather, terrain and underground geology are not controllable.

Operations on a land seismic survey involve the coordination of signal generation (shooting), placement of equipment to receive the reflected signal, and recording of the results. The logistics center of a survey is called base camp. Line crews place the equipment (channels) on the ground and use vehicles referred to as line trucks. The equipment consists of cables, receivers and boxes. Boxes collect data and perform analog to digital conversion and filtering of the data. The boxes are powered by batteries and solar panels. Source crews (sets of vibrators or dynamite shooting crews) progress through a preplanned sequence of source locations. An acquisition system, located in a recording platform, turns different receivers on and off so that the required set of receivers that monitors a single source (called a patch) is turned on for each source measurement. The acquisition system also records the results from each shot. Line crews move equipment in the direction of the progression of the survey. Typically, there is not enough equipment available to cover the entire survey area. Thus, equipment movement is required. Measurements from a single source point typically take less than one minute. Movement of receiving equipment from one patch to the next one in the shooting sequence can take several minutes. Therefore, extra equipment is used to cover several patches ahead of the current source location.

Given the high cost of performing seismic surveys, optimizing the operational as well as the geophysical aspects of the surveys is increasingly important. Because of the number of geophysical and logistical factors that influence survey results, including customer requirements and the complexity of optimization due to those factors, there is a need to develop computer models for survey optimization. The computer model needs to optimize survey operation, for example, by conducting a survey at the lowest possible cost or generating the highest possible profit, while maintaining the geophysical survey requirements.

One of the ways to formulate and solve optimization problems in 3D land seismic surveys is by using operational research mathematical programming techniques. Mathematical programming has been widely applied to solve operations problems in manufacturing, transportation and logistics, finance, and marketing where the parameters are quantifiable. Mathematical programming techniques can be used when a problem is formulated as: (i) a set of decision variables, (ii) a problem specification to be solved that is expressed as a function to be minimized or maximized (called objective function), and (iii) a set of constraints. Decision variables are quantities under the control of the decision maker. Examples of decision variables are factors such as size of the survey, the design of the survey, the amount of equipment available, and the number of crews available. It is these controllable factors that provide the decision maker with the opportunity to improve or even optimize survey design and operations. The constraints are the restrictions that bound the problem, for example, the maximum number of signals that can be generated in a day (called the number of shots). The problem specification is essentially a set of inequalities modeling the general logistical problem to be solved. Examples of problem specifications that can be modeled using sets of inequalities include: minimization of total costs in the design and operations of a land seismic survey; the optimal routing of one or more source crews through a sequence of source location points; the optimal placement of recording locations in a survey; and the optimal amount of an expendable resource to purchase prior to the survey so there is a sufficient amount of the resource available for the survey with a minimal amount remaining. These inequalities take into account the decision variables and constraints corresponding to the particular instance of the problem to be solved. Other quantities in the inequalities, called problem data or parameters, are not computed but are set to given values or a set of values. An example of problem data might be the surveying costs for every source and receiver point. After the problem is modeled as a set of inequalities, it is translated into a form suitable for solution by a solver using, for example, an algebraic modeling language. The solver then computes the values of the decision variables which optimize the objective function and satisfy the set of constraints. The values of the decision variables are computed such that the objective function is optimized and the set of constraints is satisfied. The result is an improved survey design and logistical operation.

Models become harder to solve when the decision variables are integer, the objective function and/or the constraints are nonlinear, and the problem data are stochastically defined. For integer programming problems, the computational complexity of the solution grows exponentially with the number of integer variables. No algorithm can solve all nonlinear programming problems to optimality. The best any algorithm can do in the general case is to guarantee local optimality (such as guarantee the best solution over a local region of possibilities). In certain special cases when the objective function has a special shape or structure, leading for example to the property of convexity, global optimality (the best solution over all possibilities) can also be guaranteed. To eliminate uncertainty in the data, assumptions may need to be made but may result in solutions that are far from optimal. Stochastic programming techniques use the structure of the mathematical model to furnish exact solutions or simulation (Monte Carlo sampling) to bound the optimal solution. Given all these complicating factors, an optimal solution, or a solution within a specified tolerance of the best possible solution, or just a feasible solution, that is, one that satisfies the problem constraints is sought.

Many types of commercial optimization software packages (also called solvers) exist to solve mathematical programming problems. Once the mathematical model has been formulated, it must be input to a solver. Spreadsheet packages incorporate solvers and can be used to solve small (generally less than 200 variables) 3D seismic surveying problems. For larger problems, algebraic modeling languages such as GAMS (Brooke et al. 1992) or AMPL (Fourer et al. 1993) may be required. Alternatively, a program can be written to directly call a commercially available solver library.

Problems amenable to mathematical programming techniques abound in land seismic operations. Vehicle routing problem formulations used in transportation may be adapted to the vehicles used in moving the equipment and in the shooting operations. Models used in logistics for facility locations may be used to determine the location and moves of the base camp and trucks carrying the recording system. Other problems include crew shuttling to and from remote locations, line crew scheduling, battery replacement strategies in the data recording boxes, and the balancing of workloads between line crews, line trucks, and source crews. Ultimately optimization modeling may be used to design seismic survey strategies that differ from those specified by geophysical criteria alone. For example, a seismic survey design may be developed by incorporating all costs (including cost of operations) that would ensure a certain fold coverage, offset distribution, and azimuthal distribution.

SUMMARY

The method and system of the present invention optimizes 3D land seismic survey logistics by formulating and modeling the survey problem in terms of an objective function and a set of constraints. The model is essentially a set of inequalities for modeling the problem to be solved, including the decision variables that can be controlled by the user, problem data, and the geophysical and operational constraints. Once the objective function is specified, a commercial optimization program may be used to optimize the function by computing values of the decision variables such that the objective function is optimized and the set of constraints are satisfied. Typical logistical problems that may be solved include minimizing the acquisition costs in the design and operations of the survey, optimizing source crew routing at the survey site, optimal placement of recording station locations, and the optimal amount of an expendable resource to purchase for a survey.

The present invention comprises a method for modeling and optimizing logistical operations problems in land seismic survey operations, in a computer program running on a computer processor, the method comprising formulating a logistical problem with a set of decision variables and problem data, modeling the problem as an objective function and a set of constraints expressed in terms of the problem data and the decision variables, solving the objective function and generating an optimal solution for the set of decision variables to optimize the logistical problem. Alternatively, the method may comprise identifying decision variables under the control of a user for a logistical problem, identifying a set of operational and geophysical constraints for the logistical problem, identifying variable optimization problem parameters, building a mathematical model of the logistical problem using the decision variables, constraints and problem parameters, the model being expressed as an objective function and a set of constraints expressed in terms of the decision variables and problem parameters, and generating an optimal logistical problem solution. The method may further comprise translating the mathematical model into a form suitable for solution by a solver software program and using the solver software program to solve for the decision variables which satisfy the problem constraints and optimize the objective function. The objective function and constraints may be expressed in an algebraic modeling language and solved using an optimization program that optimizes the objective function. The logistical problem may be a three dimensional (3D) seismic survey problem.

In one embodiment, the 3D seismic survey problem is to minimize acquisition costs in the design and operations of the 3D seismic survey. The decision variables identified for the 3D seismic survey may be selected from the group consisting of the number of shot locations, the number of receiver locations, placement of shot locations, the placement of receiver locations, the number of active receiver lines, the number of active receiver channels per line, coordination of shot locations and the placement of equipment to receive a reflected signal.

In building a mathematical model, the objective function and set of constraints for minimizing acquisition costs may further comprise modeling preparation costs, modeling shooting and recording costs and modeling processing costs. The preparation costs may further comprise permitting costs, surveying costs which are a function of source and receiver locations, cutting and clearing costs which are functions of the length of the source and receiver lines, and drilling costs which are a function of the number of source locations. The shooting and recording costs may further comprise crew costs and equipment costs. The processing costs may be a function of the size of the survey. The constraints may further comprise the geophysical requirements of fold, offset and azimuth, the maximum number of shots per day, and the maximum number of channels.

In one embodiment, the logistical problem is routing a 3D seismic survey source crew through a plurality of nodes in a minimum period of time. Each node may represent a rack, which is a set of source locations on the same source line between two adjacent receiver lines. The method may further comprise identifying as decision variables the number of times the source crew passes from one node to another node, requiring the constraint that each node must be visited at least once, requiring the constraint that each node must be departed at least once, and requiring the number of visits and departures from a node to be equal. In addition, the method may further comprise routing a plurality of source crews through the plurality of nodes. The method may further comprise requiring the constraint that each rack must be visited at least once by one of the crews, requiring the constraint that each source crew starts at a base camp location and returns to the base camp location, and minimizing the total cost of routing the plurality of source crews by solving for an optimal number of crews while equalizing the time for each source crew to be away from the base camp location.

In an alternate embodiment, the logistical problem is placing a recording station within a field of receiver locations such that the number of times the recording station must be moved to cover the field of receiver locations is minimized. The method further comprises identifying the location of the recording station at each point in time as a decision variable and requiring the constraint that each receiver location must be listened to at least once.

The present invention also comprises a system for modeling and optimizing logistical operations problems in land seismic survey operations. The system comprises means for identifying decision variables under the control of a user for a logistical problem, means for identifying a set of operational and geophysical constraints for the logistical problem, means for quantifying variable optimization problem parameters, and means for building a mathematical model of the logistical problem. The model may be expressed as an objective function subject to a set of inequalities representing the constraints. The objective function and constraints may be expressed in terms of the decision variables and the problem parameters. The system has a means for optimizing the objective function and solving for the decision variables while satisfying the set of constraints to generate an optimal logistical problem solution.

In one embodiment, the logistical problem is routing a 3D seismic survey source crew between a plurality of nodes in a minimum period of time. The method further comprises routing a plurality 3D seismic survey source crews between the plurality of nodes in a minimum period of time, minimizing the total cost of the 3D seismic survey, and equalizing the total amount of time each source crew is deployed during the seismic survey.

In another embodiment, the logistical operations problem is placing a recording station within a field of receiver stations such that the number of times the recording station must be moved to cover the field of receiver stations is minimized.

In another embodiment, the logistical problem is determining the amount to purchase of an expendable item needed for equipment operations such that the amount of the expendable item is sufficient for the survey operations with a minimal amount of the item remaining after the survey operation is complete. The expendable item may be vehicle fuel.

In another embodiment, the logistical problem is placing shot locations so as to minimize the cost of the seismic survey while satisfying the operational and geophysical survey constraints. The survey constraints may further comprise placing the shot locations to achieve a minimum fold coverage, placing the shot locations so the locations fall within a minimum and maximum offset, and placing the shot locations so the locations fall within a minimum and maximum azimuth. The problem parameters may further comprise the cost of locating the shot location at a potential shot point, a set of shot locations that fall into a bin, the number of shot locations in the bin that fall into a minimum and maximum offset, minimum and maximum fold coverage for the bin that fall into the minimum and maximum offset, a set of shot locations for the bin that fall into a minimum and maximum azimuth, and minimum and maximum fold coverage for the bin that fall into the minimum and maximum azimuth.

In another embodiment, the logistical problem is placing shot locations and determining source crew routing so as to minimize cost of the seismic survey while satisfying the operational and geophysical survey constraints. The method may further comprise determining the sequence of shots and determining new locations for shots to avoid shot exclusion zones. The shot exclusion zones where shot locations are to be avoided are problem parameters that may be determined by a user. Alternatively, the shot exclusion zones may be seismic survey operational and geophysical constraints. The problem parameters may further comprise the cost of placing the shot location at each shot point, the cost of a source crew traveling between shot locations, and the set of possible base camp locations. The survey constraints may further comprise placing the shot locations to achieve a minimum fold coverage, placing the shot locations so the locations fall within a minimum and maximum offset, placing the shot locations so the locations fall within a minimum and maximum azimuth, requiring the source crew to enter each shot location at least once, requiring the number of visits to and departures from a node to be equal, and allowing only one base camp to be selected from the set of possible base camp locations. The logistical problem may further comprise determining shot locations that are offset from an exclusion zone in a completed survey design to avoid obstacles in the survey field. The survey constraints may further comprise determining a set of offset shot locations for each location to be avoided in a completed survey design, requiring at least one source crew to enter and leave each location, equalizing the length of time for each source crew to visit the shot locations for a plurality of source crews, placing the shot locations to achieve a minimum fold coverage, placing the shot locations so the locations fall within a minimum and maximum offset, placing the shot locations so the locations fall within a minimum and maximum azimuth, requiring the number of visits to and departures from the shot locations by the source crew to be equal, and allowing only one base camp to be selected from the set of possible base camp locations. The logistical problem may further comprise optimizing source location, vehicle routing and receiver equipment layout operational constraints.

BRIEF DESCRIPTION OF THE DRAWINGS

These and other features, aspects and advantages of the present invention will become better understood with regard to the following description, appended claims and accompanying drawings where:

DETAILED DESCRIPTION OF THE DRAWINGS

Figure 1:
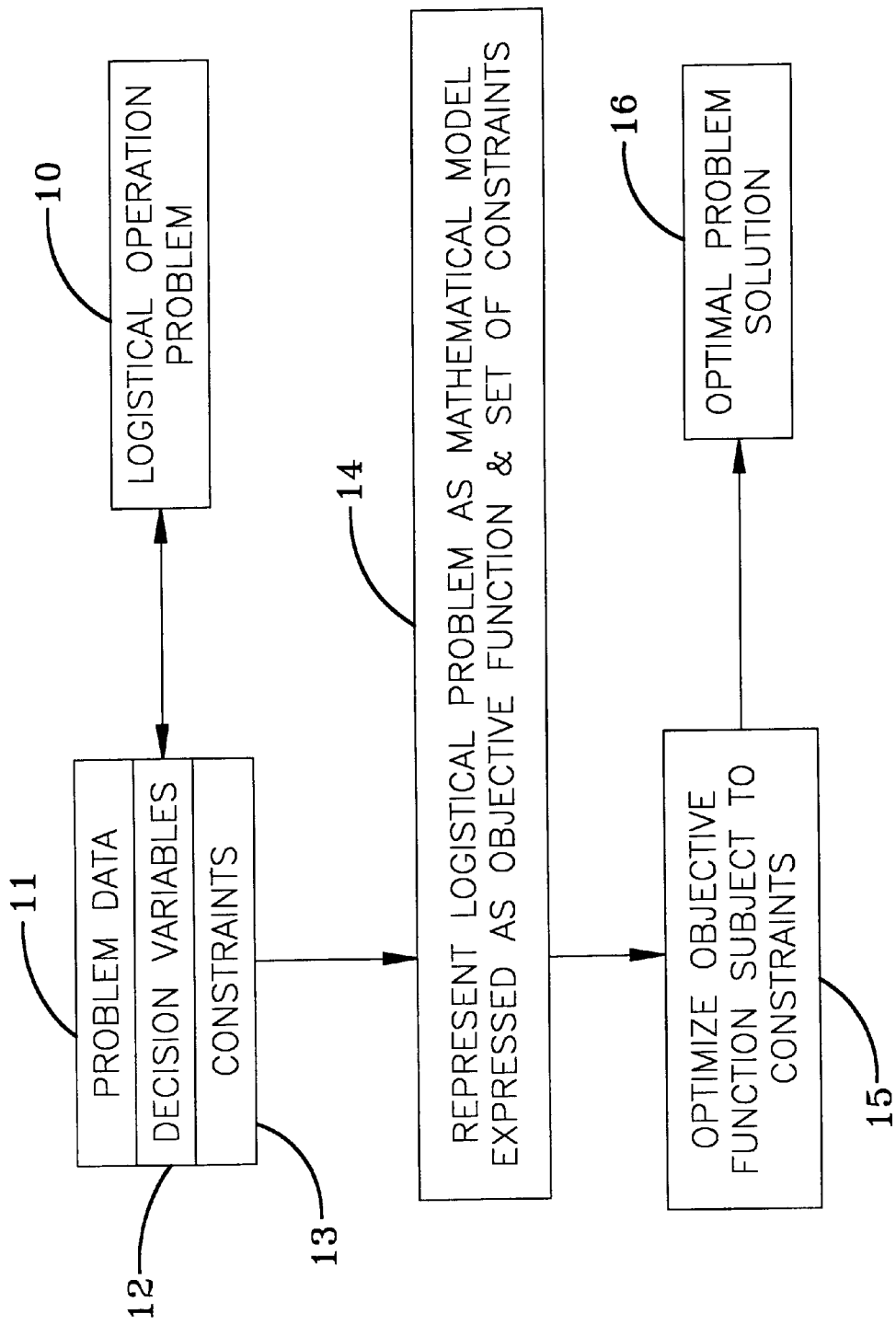
FIG. 1 is a block diagram depicting the general process of solving a logistical operations problem using a mathematical programming model.

FIG. 1 shows a block diagram depicting the general process of solving a logistical operations problem by formulating a mathematical programming model. The problem to be solved is first identified 10. The problem data parameters 11, decision variables 12 and constraints 13 are also identified. The logistical problem is represented as a mathematical model in terms of decision variables and the problem parameters 14. The model is expressed as an objective function and a set of inequalities representing the constraints of the problem. The model is then translated into a form suitable for solution by a solver program, using for example, an algebraic modeling language. The objective function is then optimized subject to the constraints 15 by using a commercial optimization software solver package. An optimal problem solution 16, that is a set of optimal decisions, is obtained.

Figure 2:
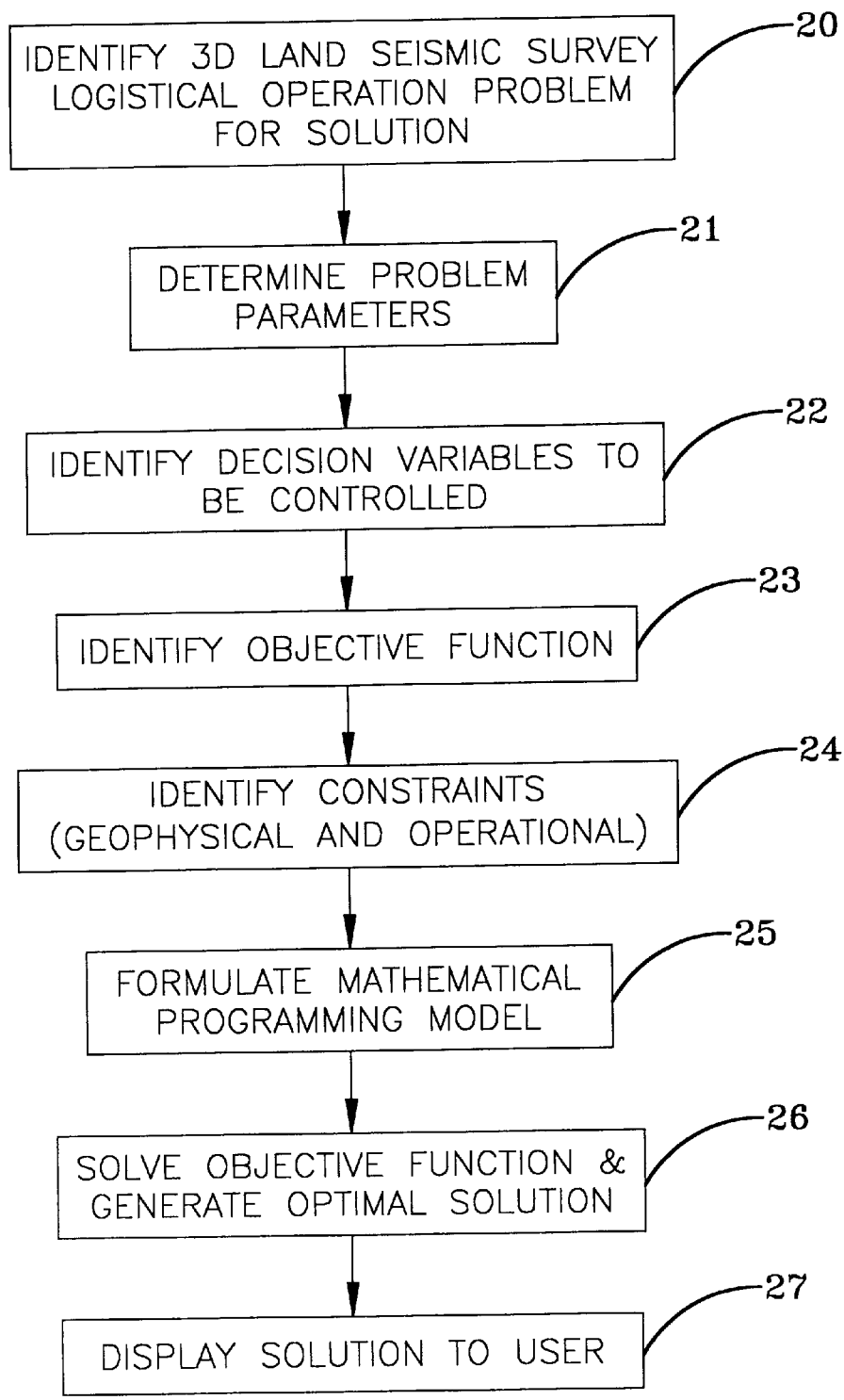
FIG. 2 is a flow diagram depicting a high level view of formulating a mathematical programming model for solving a 3D seismic surveying logistical operations problem.

FIG. 2 shows a flowchart depicting a high level view of formulating a mathematical programming model for solving a 3D land seismic surveying logistical operations problem. In formulating a mathematical programming model, the first step is to identify the 3D seismic survey problem to be solved, and expressing it as a problem statement 20. Problem data or parameters, that is quantities that are not computed but set to given values or set of values, are determined 21. The decision variables, those quantities under the control of the user and that may be optimized, are identified 22. The objective function is identified 23 and the constraints, both geophysical and operational, are also identified 24. The problem is then modeled in the form of a mathematical program, expressed as an objective function and set of constraints. The set of constraints is represented by a set of inequalities 25. An optimizer or solver is then used to solve the model and generate an optimal solution for the objective function 26 which may be displayed to a user 27. During optimization, an attempt is made to compute the values of the decision variables such that the objective function is optimized and the set of constraints are satisfied.

Figure 3:
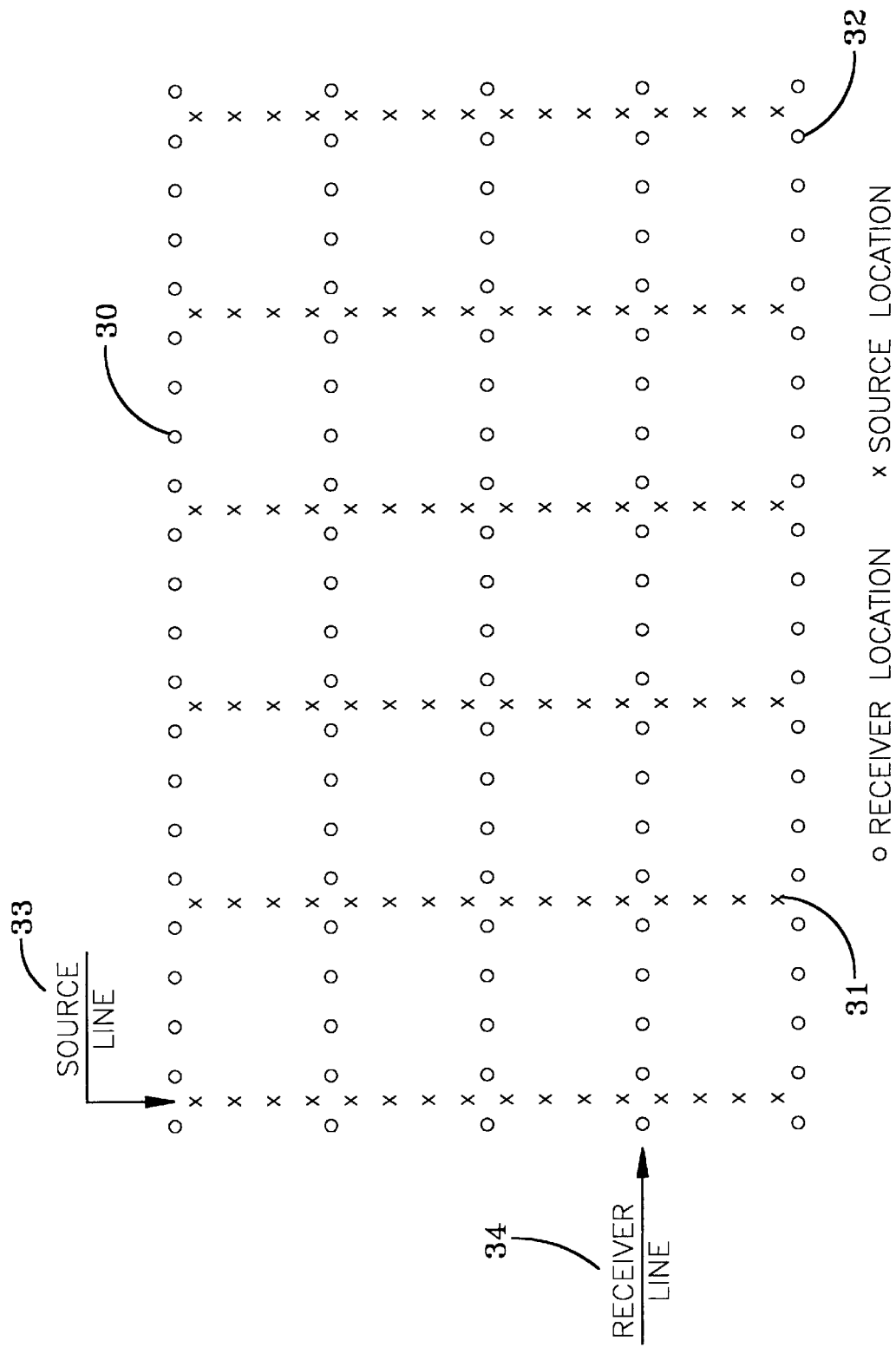
FIG. 3 shows a 3D orthogonal survey design.

FIG. 3 shows a 3D orthogonal survey design 30 where sources and receivers are located on a plain over the earth's surface and form a grid pattern. The vertical lines in FIG. 3 contain source locations 31 (represented by an "X") and the horizontal lines receiver locations 32 (represented by a "•"). Design considerations for the orthogonal survey design 30 include the spacing of the source 33 and receiver 34 lines, and the spacing of the source and receiver locations along the source and receiver lines 33–34. There are many different designs that exist for 3D surveys, often with more complicated design criteria than the one presented in FIG. 3.

Figure 4:
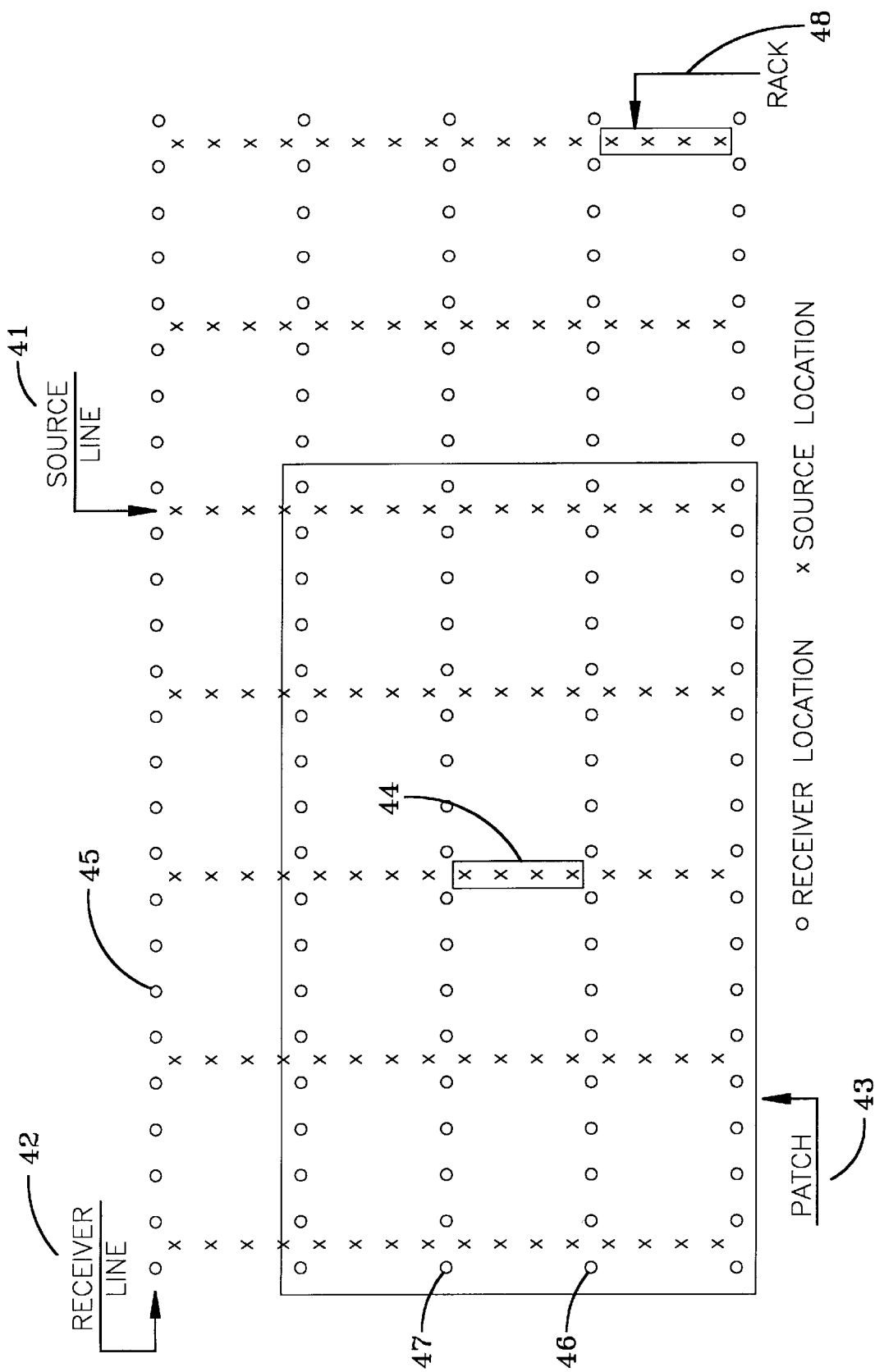
FIG. 4 shows a survey design where the signal sent from any given source point is monitored by multiple receivers on different lines.
Figure 18:
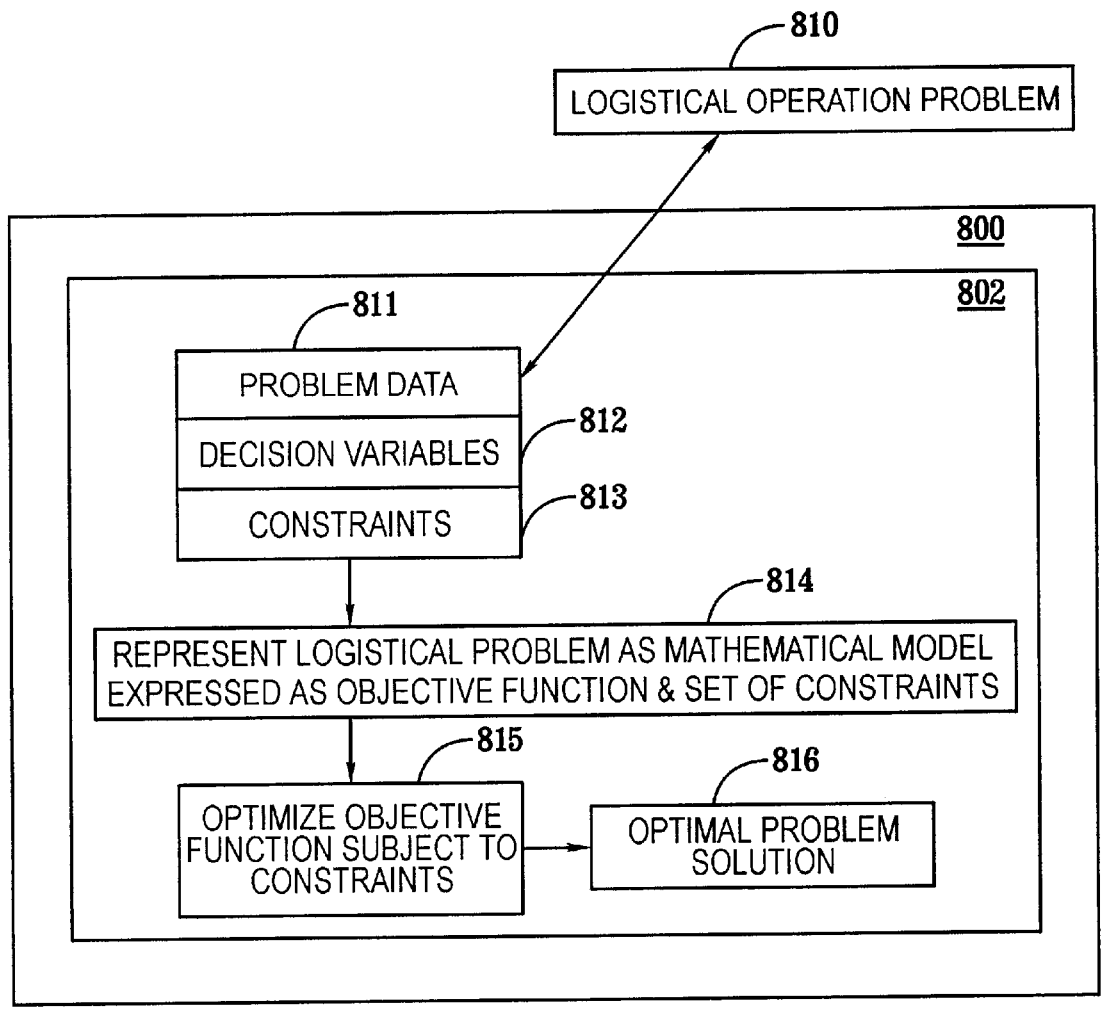
FIG. 18 is a block diagram illustrating a computer processor and a computer program embodiment of the invention.

FIG. 4 shows the survey design of FIG. 3 in more detail, where the signal sent from any given source point 41 is monitored by multiple receivers 42 on different lines. The set of receivers 42 that monitor a single source signal is often referred to as a patch 43. Two racks are shown 44 and 48. A rack is a set of source locations on the same source line between two adjacent receiver lines. For example, rack 44 is the set of source locations 41 on the same source line 45 between two adjacent receiver lines 46–47. In general, all sources in a single rack 44 shoot into the same patch 43. The survey design in FIG. 4 is called an orthogonal, split-straddle design because there are an equal number of receiver lines on each side of the rack 44 in the patch 43. FIG. 18 is a block diagram illustrating a computer processor and a computer program embodiment of the invention. A computer 800 executes a computer program 802 for modeling and optimizing logistical operations problems 810 in land seismic survey operations. The computer program 802 contains logic for identifying decision variables 812 under user control for a logistical problem 810. The computer program further consists of logic to identify geophysical and operational constraints 813 and logic for quantifying variable problem parameters 811 for the logistical problem 810. The decision control variables, problem parameters, and constraints are input to a logic 814 for building a mathematical model of the logistical problem 810, the model being expressed as an objective function subject to a set of inequalities representing the constraints, the objective function being expressed in terms of the decision variables and problem parameters. The mathematical model is input to a logic 815 for optimizing the objective function and solving for the decision variables while satisfying the set of constraints to generate an optimal logistical problem solution 816.

Figure 5:
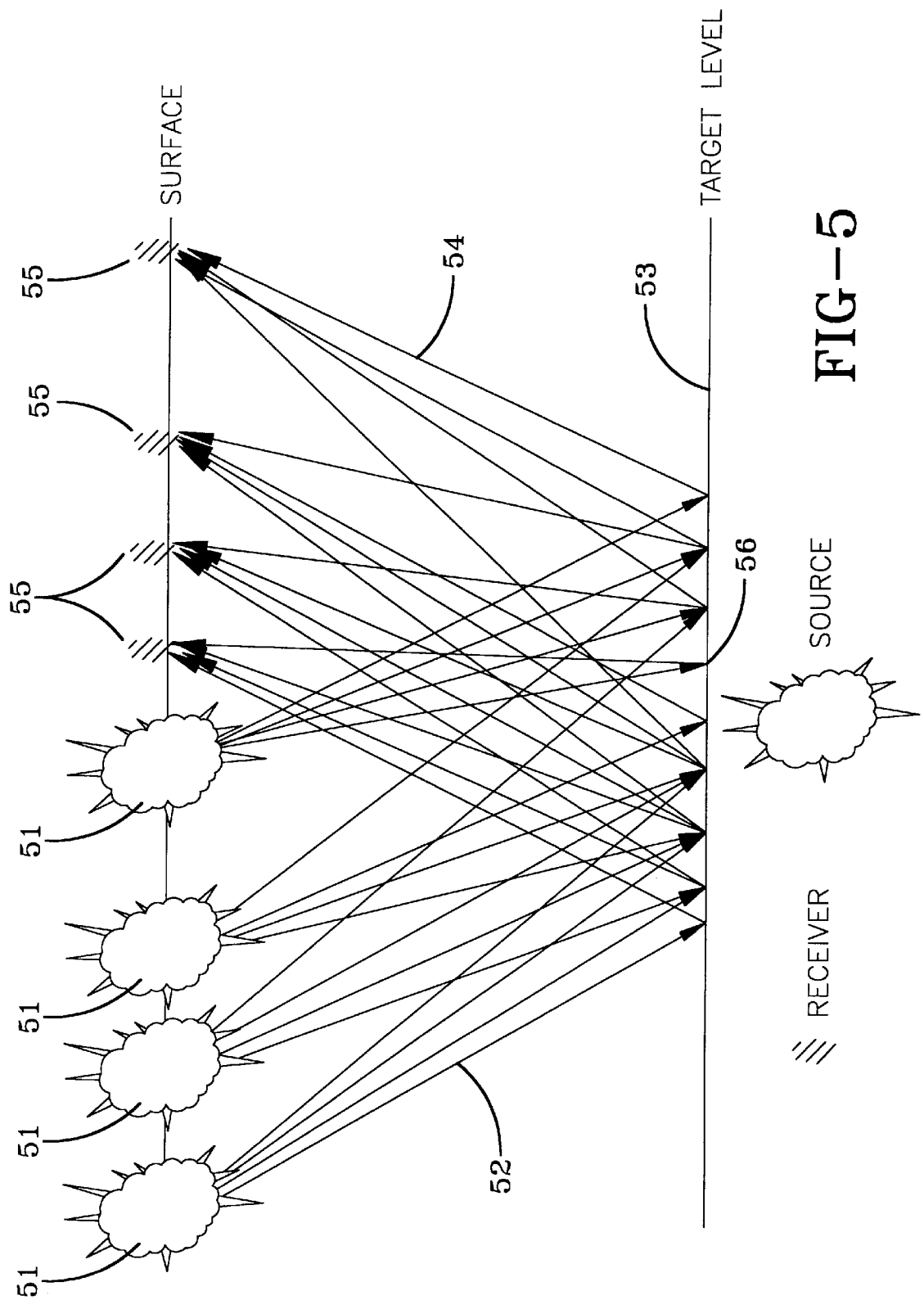
FIG. 5 shows an instance of reflection seismology.

FIG. 5 depicts an instance of reflection seismology. In reflection seismology, a signal is generated from a source point 51, follows along a ray path 52, and is reflected off an underground target level 53. The reflected ray path 54 returns to a receiver point 55. The reflected signal 54 provides information on the underground structure, in this case, a subsurface layer. The point of reflection of the underground target 53 between the source 51 and receiver 55 is called the common midpoint (CMP) 56. In seismic surveying, several receivers are usually activated to detect the signal sent out from a single source point. This permits the simultaneous sampling of several CMP 56. If the process is repeated for several sources 51, then the same CMP 56 get sampled several times. Sampling on the same point improves the signal-to-noise ratio (S/N) for the processing of the data. CMPs 56 that share more or less the same position are grouped into predefined rectangular bins. Bin size depends on target size, spatial resolution required, and economics. The economic aspect is based on the direct relationship between the bin size, and the source and receiver locations spacing. For an orthogonal design as shown in FIG. 3, the bin dimensions are one half the source and receiver spacings. During processing, the data in each bin are averaged (or stacked) in order to improve the (S/N). The number of CMPs in each bin is called the fold coverage. The source/receiver pairs for each bin have a range of offsets (distance from shot point to receiver) and azimuths (direction or compass angle from shot point to receiver). Fold coverage, range of offsets, and range of azimuths are the main measures by which the geophysical requirements of a 3D survey are assessed.

Figure 6:
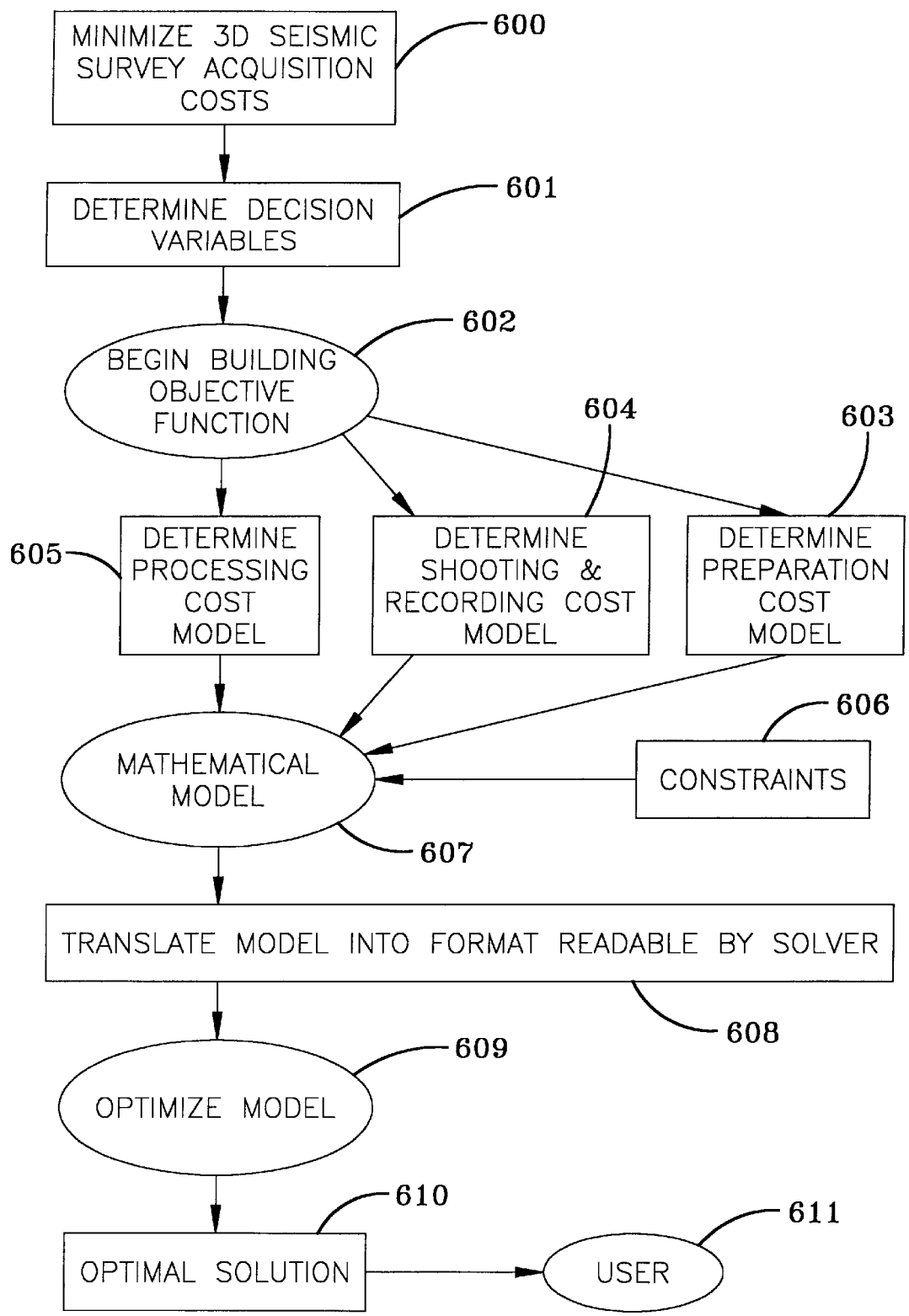
FIG. 6 is a flow diagram for formulating a mathematical programming model for minimizing 3D survey acquisition costs in the design and operations of a 3D seismic survey.

Turning now to FIG. 6, a data flow diagram for formulating a mathematical program model for minimizing 3D survey acquisition costs in the design and operations of a 3D seismic survey is shown. In FIG. 6, the flow diagram of FIG. 2 is implemented to solve the specific problem of minimizing survey acquisition costs 600. Source and receiver points in the survey are arranged in an orthogonal split-straddle design as shown in FIG. 4. The next step in formulating a mathematical programming model is to decide what decisions can be made that provide the opportunity to improve the survey design and operation and to determine the decision variables 601. On a land seismic survey, the main decisions involve how to shoot the survey and how to place the receiving equipment. These decisions must be made in the most cost effective manner subject to the geophysical and operations requirements of the survey. Decision variables for this problem are shown in Table 1.

TABLE 1

SLS: Shot Line Spacing (km)
RLS: Receiver Line Spacing (km)
RS:: Receiver Spacing (km) in a line
SS: Shot Spacing (km) in a line
NR: Number of active receiver channels
NL: Number of active receiver lines
NS: Number of shots per square kilometer
ND: Number of shots per day per source crew
NSB: Number of shot locations between each receiver line
NRB: Number of receiver locations between each shot line TABLE 1-continued NRL: Number of active receiver channels per active receiver line
HNL: One half the number of receiver lines (used to constrain the number of receiver lines to be even for the split-straddle design).

The next step is to begin to define the objective function 602. Using a top-down formulation approach, we start with:
Minimize Total Acquisition Costs per square km.
The objective can be subdivided and restated as:
Minimize Preparation Costs per square km+Shooting and Recording Costs per square km+Processing Costs per square km.

Figure 7:
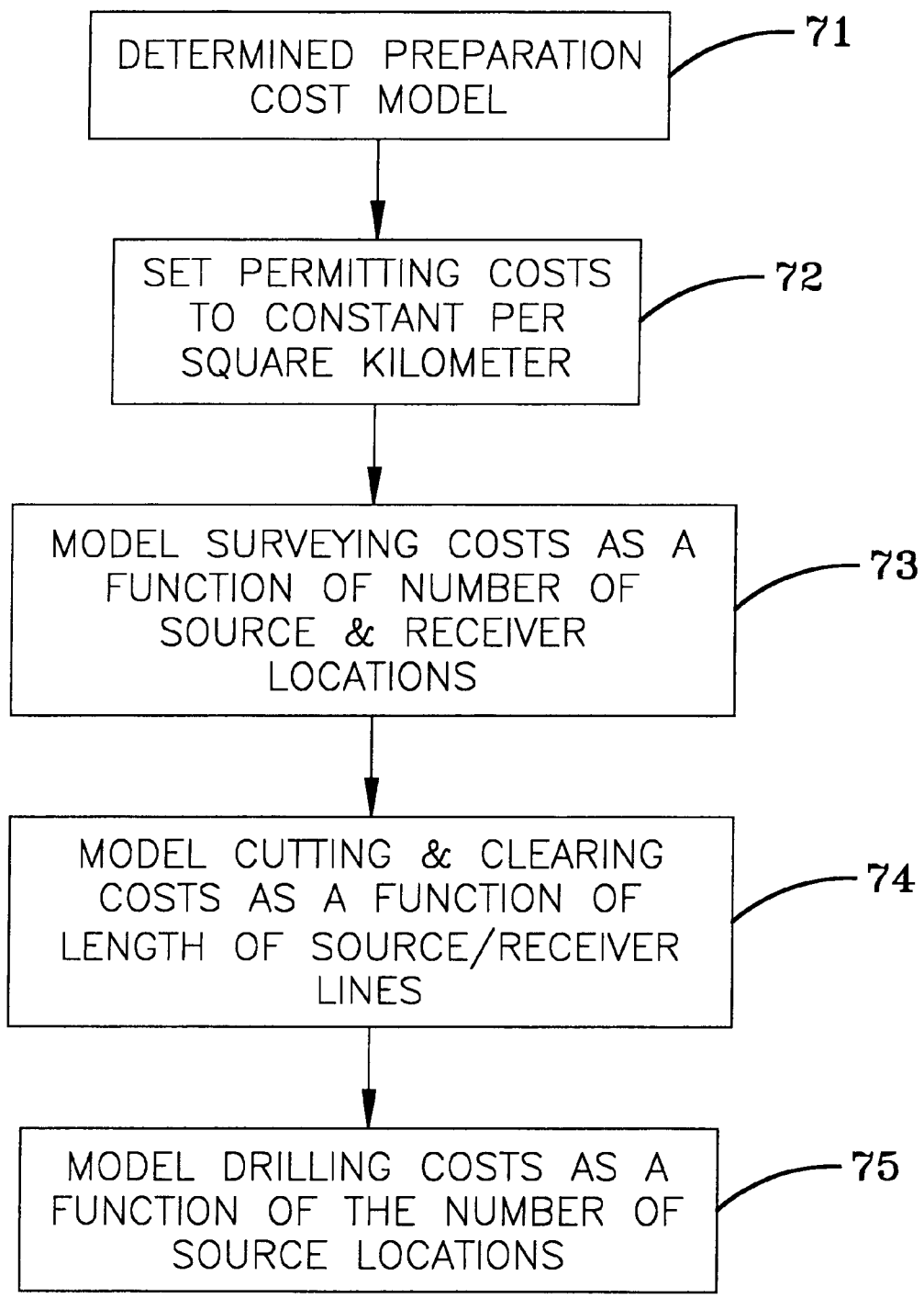
FIG. 7 is a flow diagram for determining the preparation cost model.

A preparation cost model is then determined 603. FIG. 7 is a flowchart that depicts the details of determining the preparation cost model 71. Preparation Costs include permitting costs 72, surveying costs 73, cutting and clearing costs 74, and drilling costs 75 (in the case when dynamite is used as the source). We assume that permitting costs 72 are a function of area and hence are constant per square km. Surveying costs 73 are a function of the number of source and receiver locations. The survey costs per square km can be written as $$C_{SSV}*(1/SS)*(1/SLS)+C_{RSV}*(1/RS)*(1/RLS),$$

where $C_{SSV}$ and $C_{RSV}$ are surveying cost per source point and surveying cost per receiver point, respectively. The quantities $C_{SSV}$ and $C_{RSV}$ are examples of problem data that are assumed to be fixed and known.

The cutting and clearing costs 74 are functions of the length of the source and receiver lines. This quantity may be written as $$C_{SCC}*(1/SLS)+C_{RCC}*(1/RLS),$$

where $C_{SCC}$ and $C_{RCC}$ are cutting and clearing costs per km for source and receiver lines, respectively.

Drilling costs 75 are a function of the number of source locations, assuming that the depth of the charge hole is constant. Therefore, drilling costs per square km may be written as $$C_{DR}*(1/SS)*(1/SLS),$$

where $C_{DR}$ is the drilling cost per source location. For a survey on which the source is not dynamite, $C_{DR}$ is set equal to zero.

Turning back to FIG. 6, shooting and recording cost models are determined 604. Shooting and recording costs can be separated into two components: crew costs and equipment costs. We assume that crew costs can be stated as an average daily rates. Thus, crew costs per square km are $$C_{CR}*(NS/ND),$$

where $C_{CR}$ is the average daily cost of the crew. We assume that an average daily equipment cost can be obtained which varies with the number of receiver channels used on the job. This can be stated as $$C_{EQ}*(NR*(1+I))*(NS/ND),$$

where $C_{EQ}$ is the equipment cost per channel per day and I is an inflation factor to calculate the total number of channels used by the crew (active patch+spares). For example, if I equals 0.5, the total number of channels is 1.5 times the number needed to cover the active patch.

The final cost component is to determine the processing cost model 605, which is a function of the size of the survey and is stated as $C_{pc}$ for average processing costs per square km.

A mathematical model of the objective function is built by combining the above costs together and can be written as Minimize $(C_{SSV}+C_{DR})*(1/SS)*(1/SLS)+C_{RSV}*(1/RS)*(1/RLS)+C_{SCC}*(1/SLS)+C_{RCC}*(1/RLS)+(C_{CR}+C_{EQ}*(NR*(1+I)))*(NS/ND)+C_{PC}$.

Constraints 606 bounding the problem must be determined. In this case the constraint set includes the geophysical requirements of fold, offset (max, and max min), and azimuth. The constraint for fold is $NR*NS*B_x*B_y-F \geq 0$, where $B_x$ and $B_y$ are the dimension of the bin (in km) in the in-line and cross-line directions, and F is the required fold coverage. In order to constrain azimuth, maximum in-line and cross-line offset will be used. Although in-line and cross-line offsets constrain azimuth in a crude manner, this practice is common in practice in the field. These constraints are Maximum in-line offset: $(NR/NL)/2*RS-RS/2 \geq O_{IN}$ and Maximum cross-line offset: $NL/2*RLS-SS/2 \geq O_{CR}$, where $O_{IN}$ and $O_{CR}$ are the required maximum in-line and cross line offsets, respectively. The constraints for the offsets are Maximum: $((NR/NL)/2*RS-RS/2)^2+(NL/2*RLS-SS/2)^2 \geq (O_{MAX})^2$ and Maximum Minimum: $(SLS)^2+(RLS)^2 \leq (O_{MIN})^2$, where $O_{MAX}$ and $O_{MIN}$ are the required maximum offset and the maximum minimum offset, respectively.

The following operational constraints 606 are also required:

Maximum number of shots per day: $ND \leq S[<i]nfMAX$ and

Maximum number of channels: $NR(1+I) \leq C_{MAX}$, where $S_{MAX}$ and $C_{MAX}$ are the maximum number of shots per day and the maximum number of receiver channels available to the crew, respectively.

In addition, constraints are included to ensure that various decision variables are consistently and practically defined. The relationship between shot and receiver spacing and the dimensions of the bins are characterized by $RS=2*B_X$, and
ti $SS=2*B_Y$.

The following constraint relates NS, SS, and SLS:

$NS*SS*SLS=1$.

The distance between each receiver line must be an integer number of shot locations:

$RLS-NSB*SS=0$.

The distance between each shot line must be an integer number of receiver locations:

$SLS-NRB*RS=0$.

A constraint to ensure the same number of channels per active receiver line is:

$NR-NL*NRL=0$.

To constrain the number of receiver lines to be even for the split-straddle design, the following constraint is necessary:

$NL-2*HNL=0$.

Finally, all decision variables are constrained to be positive, i.e.,

SLS, RLS, RS, SS, NR, NL, NS, ND, NSB, NRB, NRL, HNL $\geq 0$, and NR, NL, NS, ND, NSB, NRB, NRL, and HNL are constrained to be integer-valued.

The complete mathematical model for this problem is built 607 using the costs and the constraints, and is expressed as:

Minimize $(C_{SSV}+C_{DR})*(1/SS)*(1/SLS)+C_{RSV}*(1/RS)*(1/RLS)+C_{SSC}*(1/SLS)+C_{RCC}*(1/RLS)+(C_{CR}+C_{EQ}*(NR*(1+I)))*(NS/ND)+C_{PC}$, subject to the constraints shown in Table 2 below.

TABLE 2

Fold: $NR * NS * B_x * B_Y > F$
Maximum in-line offset: $(NR/NL)/2*RS - RS/2 \geq O_{IN}$
Maximum in-line offset: $NL/2*RLS - SS/2 \geq O_{CR}$
Maximum offset: $((NR/NL)/2*RS - RS/2)^2 + (NL/2*RLS - SS/2)^2 \geq (O_{MAX})^2$
Maximum minimum offset: $(SLS)^2 + (RLS)^2 \leq (O_{MIN})^2$
Maximum number of shots per day: $ND \leq S_{MAX}$
Maximum number of channels: $NR(1 + I) \leq C_{MAX}$
In-line bin size: $RS/2 = B_x$
Cross-line bin size: $SS/2 = B_Y$
Shot relationship: $NS * SS * SLS = 1$
Number of shot locations between each receiver line: $RLS - NSB * SS = 0$
Number of receiver locations between each shot line: $SLS - NRB * RS = 0$
Number of active channels per active receiver line: $NR - NL * NRL = 0$
Ensure an even number of receiver lines: $NL - 2 * HNL = 0$
Nonnegativity: SLS, RLS, RS, SS, NR, NL, NS, ND, NSB, NRB, NRL, HNL $\geq 0$
Integer: NR, NL, NS, ND, NSB, NRB, NRL, and HNL integer-valued The problem is now stated as an objective function and set of constraints and is represented as a set of integer, nonlinear inequalities for minimizing 3D seismic survey acquisition costs 608. Various optimization programs exist for finding local optimal solutions to a problem of this form, although these algorithms do not guarantee a global optimal solution. The model is translated into a format that is compatible with a solver program 608, for example by using an algebraic modeling language. It is solved using one of these solver optimization programs 609. A local optimal solution 610 is generated and may be displayed to a user 611.

Optimizing Source Crew Routing in a Seismic Survey

Figure 8:
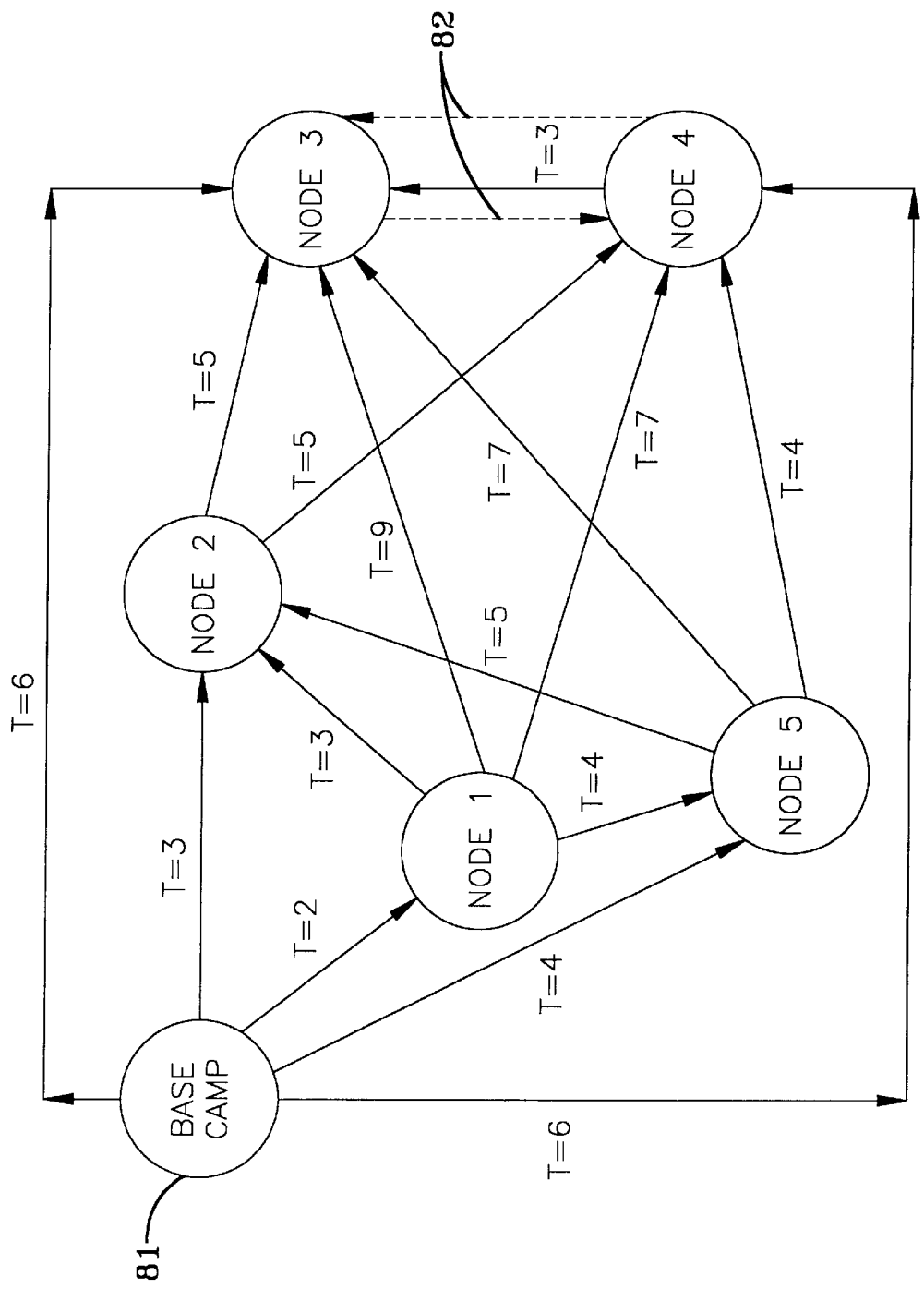
FIG. 8 shows a set of locations to be visited by a source crew.

Another 3D seismic survey problem solved using mathematical programming techniques is the optimal routing of one or more source crews through a sequence of source location points. FIG. 8 represents a set of locations for a source crew to visit (called nodes 1–5). Each node 1–5 represents a rack, which is the set of source locations on the same source line between two adjacent receiver lines. FIG. 8 is limited to 5 racks, labeled nodes 1 to 5, arbitrarily located, and a base camp 81 to simplify the example (number of nodes=n=6), but could be extended to represent additional locations of racks in the survey. Arcs between the nodes 1–5 represent access roads. The time needed to go from one node to the other one is known and indicated on each arc ($t_{ij}$ between node i and node j). For example, the time to go from the base camp 81 to node 5 is shown as T=4. The arcs are directed, that is, the cost of traveling from node i to node j may differ from the cost of traveling from node j to node i. This can happen, for example, when the path between two nodes is a road, and that both directions on this road are not adjacent, but go on each side of a hill. It allows more flexibility by removing symmetry in the graph. Nevertheless, to simplify the model, we set $t_{ij}=t_{ji}$ in the example. Due to this symmetry, only half the arcs are represented in FIG. 8.

Consider first that only one source crew is available. We want to determine what is the optimal path this crew should follow to visit all the Nodes 1–5 in a minimum amount of time as shown in Table 3. The number of times crews pass through an arc is called the flow on this arc.

TABLE 3

| Decision Variables: | $X_{ij}$, the flow in arc from node i to node j. |
|---|---|
| Objective: | Minimize the time to visit all the nodes. |
| Constraint: | Each node must be visited at least once. |
| | Each node must be departed once. |

The objective function is expressed as:

$$minimize_x \sum_{i=1}^{n} \sum_{j=1}^{n} t_{ij} * X_{ij}$$

subject to the set of constraints $$\sum_{i=1}^{n} X_{ij} \geq 1 \quad \text{the crew enters each rack at least once}$$

$$\sum_{j=1}^{n} X_{ij} \geq 1 \quad \text{the crew leaves each rack at least once}$$

$$X_{ij} \geq 0 \text{ and integer}$$

with $i \in \{1, \ldots, n\}$ and $j \in \{1, \ldots, n\}$.

This model is a variation of the Traveling Salesman Problem (TSP). The main difference is the possibility to visit a rack several times, allowed by the inequality in $$\sum_{i=1}^{n} X_{ij} \geq 1.$$

Shooting times are not included in the objective function, but if they were we would assume that racks are shot only the first time they are visited.

Figure 9:
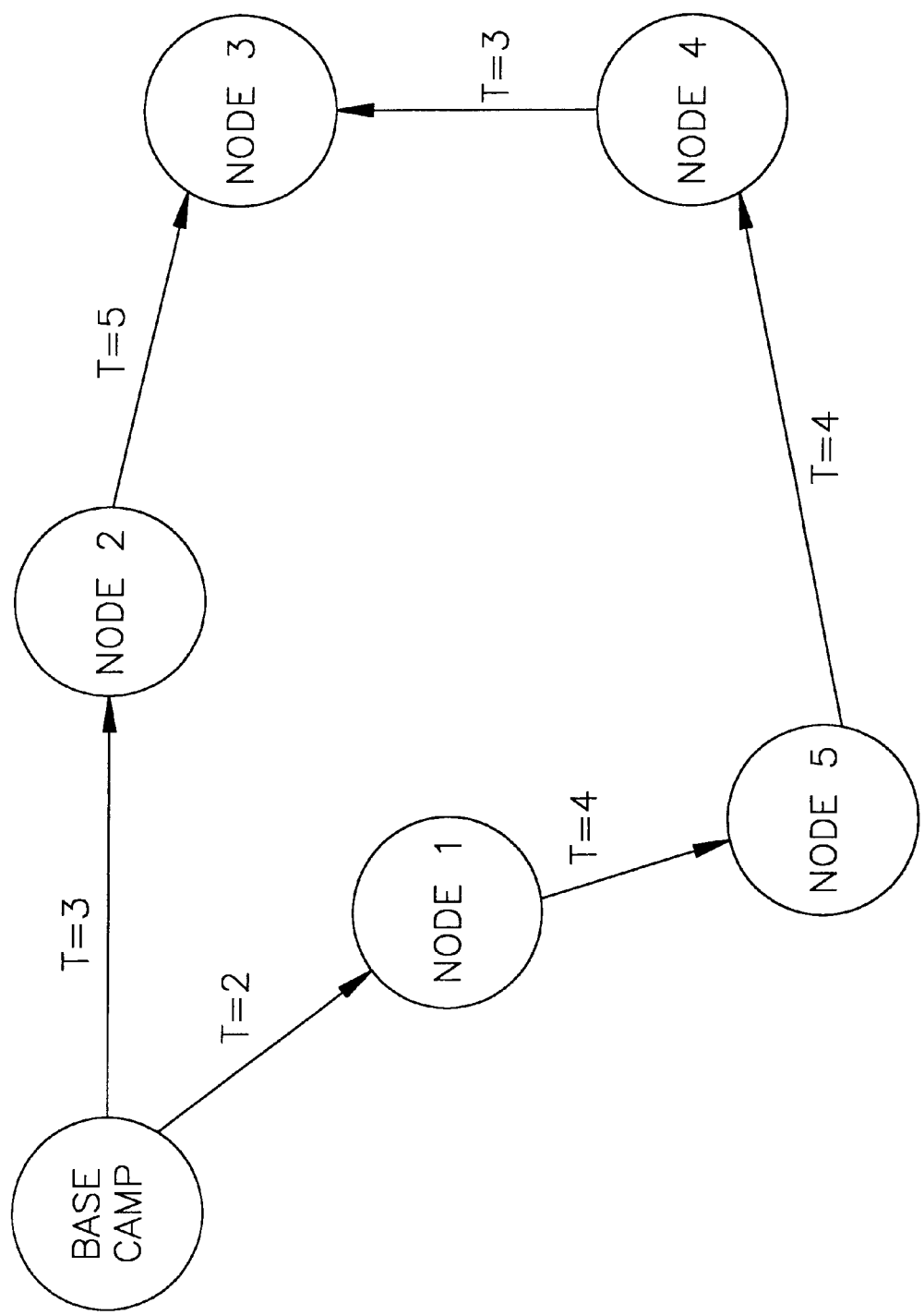
FIG. 9 shows an optimal solution for the set of locations of FIG. 8 to be visited by one source crew.

The objective function is optimized by an optimization program. FIG. 9 shows an optimal solution for the set of locations in FIG. 8 to be visited by one source crew. The total time is equal to 21 time units. Arrows are not drawn on each arc between nodes 1–5 and base camp because the tour can be done in one direction or the other (indicated by $t_{ij}=t_{ji}$).

It is important to notice that the model is under-constrained: it doesn't prevent undesirable tours, such as tours isolating subsets of nodes (shown as an isolated loop between nodes 3 and 4 (82) in FIG. 8). In order to eliminate this isolated loop and generate the solution in FIG. 9, we must include an additional constraint:

$X_{13}+X_{14}+X_{23}+X_{24}+X_{53}+X_{54}+X_{63}+X_{64}>=1$.

Figure 10:
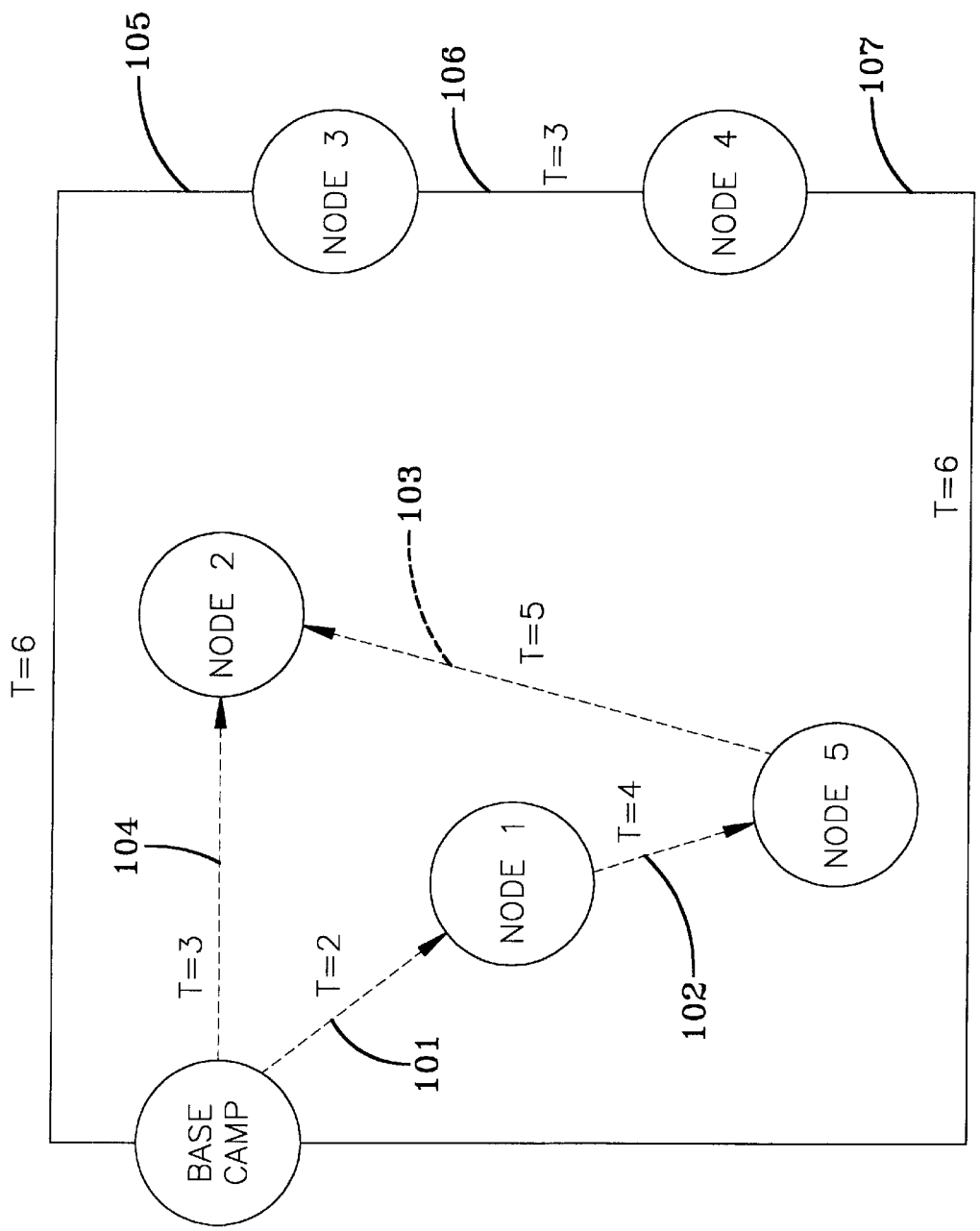
FIG. 10 shows an optimal solution for the set of locations of FIG. 8 to be visited by two source crews.

FIG. 10 shows an optimal solution for the set of locations of FIG. 8, to be visited by two source crews. Several source crews may be available to work in parallel. The dashed lines 101 through 104 represent Source Crew No. 1. The solid lines 105 through 107 represent Source Crew No. 2. Each node 1–5 must be visited by at least one crew. The total time needed to visit all the nodes should be minimized, and the optimal number of crews must be determined. The cost of operating a crew is set to Crun. and all the crews are assumed to have the same cost. If not, each crew k can be assigned a specific cost, Crunk. The new model is formulated as shown in Table 4.

TABLE 4

| Decision: | *$X_{ijk}$, flow on arc i–>j for source crew k. |
|---|---|
| Variables | *$Y_k$, set to 1 if source crew k is used, 0 otherwise. |
| | *z is a variable that is used to balance the length of the crew tours. This is to ensure that the work is balanced between the crews. |
| Objective: | Minimize total cost. |
| | The total cost has two components, the survey cost, proportional to the time spent on the job, and the operations cost, proportional to the number of source crews used. The time spent on the job is the longest time spent by a crew. |
| Constraints: | *Same as above |
| | *The same source crew must leave and enter a rack. |
| | *A crew cannot go anywhere if it is not "in use". |
| | *Each crew starts at the base camp and comes back to the base camp. |

The total cost assumes that we can compare the two components of the total cost (including a scaling factor in Crun if needed).

The problem is modeled as the objective function:

$$minimize_{x,y,z}\left(z + Crun * \sum_{k=1}^{n} Y_k\right)$$

subject to the constraints:

$$z \geq \sum_{i=1}^{n} \sum_{j=1}^{n} X_{ijk} * t_{ij} \quad \text{balance the lengths of the tours}$$

$$\sum_{j=1}^{n} \sum_{k=1}^{n} X_{ijk} \geq 1 \quad \text{at least one source crew leaves each node}$$

$$X_{ijk} \leq Y_k \quad \text{a source crew must exist to go somewhere}$$

$$\sum_{j=1}^{n} X_{ijk} = \sum_{j=1}^{n} X_{jik} \quad \text{all that enter a node leave the node}$$

$$\sum_{j=1}^{n} X_{(BC)jk} = Y_k \quad \text{each source crew starts at the base camp}$$

$Z \geq 0$ $Y_k = 0, 1$ $X_{ijk} \geq 0$ and integer with $i \in \{1, \ldots, n\}, j \in \{1, \ldots, n\}, k \in \{1, \ldots, n\}$. The length of the tours are balanced (as much as physically possible) using the variable z because the first constraint ensures that z is larger than the longest tour and the objective function minimizes z.

This model is under-constrained because it does not prevent undesirable tours (shown as an isolated loop between nodes 3 and 4 in FIG. 8). Such tours may appear when several source crews are allowed. To eliminate such undesirable tours, constraints must be added.

A first method to eliminate undesirable tours, which is more general, connects the isolated subsets of nodes to the rest of the network. Constraints state that if a crew connects nodes i and j, then it must enter nodes i or j from another node in the network. $O(2^{n+1})$ constraints are needed to connect every possible subsets of nodes to the rest of the network.

A second method implements a labeling of the nodes, and adds $O(n^2)$ constraints. With less strict restrictions, the number of these constraints can be decreased to $O(n)$.

In practice, these methods usually require only a small subset of the total number of constraints. Because the first method generates stronger constraints, it is usually preferred to the other methods in the literature.

The objective function is now optimized subject to the set of constraints using a solver. The maximum number of source crews available is set to the number of nodes (or racks). The optimal solution for two source crews is shown in FIG. 10. It requires 2 sets of source crews, Source Crew No. 1 one covering nodes (or racks) 1, 5 and 2 (total time=14 time units) 101–104. Source Crew No. 2 covers nodes (or racks) 3 and 4 (total time=15 time units) 105–107. Thus, the total time spent on the job decreases by 6 time units by adding this extra crew at a cost of Crun.

It is important to note that although this problem formulation has been used to demonstrate routing of source crews, similar formulations could be developed for the routing of other vehicles on a land seismic survey, including line vehicles and trouble shooting vehicles. The problem can be complicated by adding time windows during which the racks must be visited. Other models can be used to optimize the routing of vehicles of finite capacity picking up equipment at some nodes and dropping it off at other nodes.

Optimizing the Placement of Recording Stations within a Seismic Survey

Figure 11:
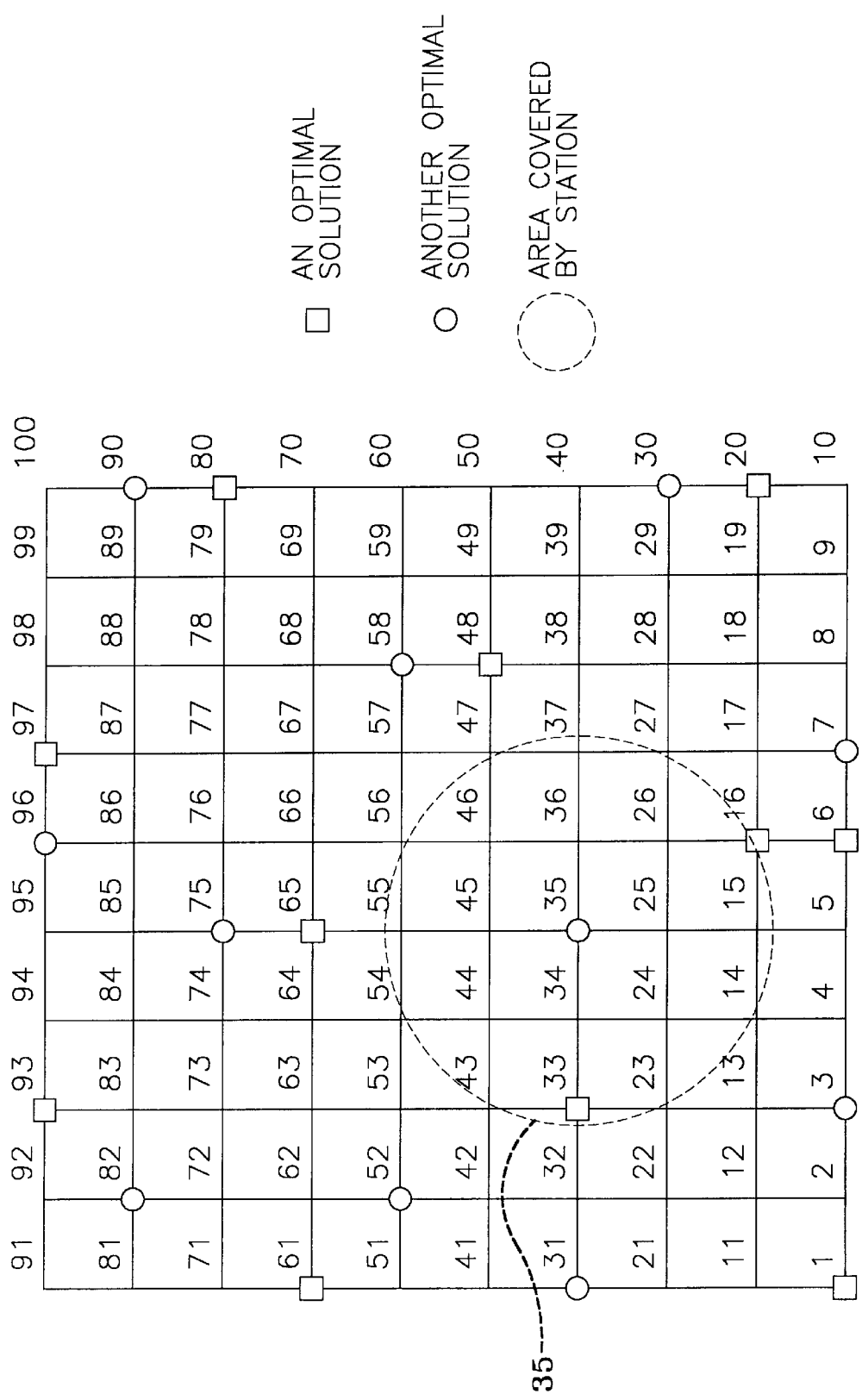
FIG. 11 shows the grid pattern and solution for a problem of optimally placing a recording station within a survey.

Another 3D seismic survey problem solved using mathematical programming techniques is the optimal placement of recording station locations within a survey. FIG. 11 shows the grid pattern and solutions for such a location problem. In this example, consider a square grid, of 10 points per side. Each corner of the grid represents a receiver location. The lowest left corner location is labeled 1. The label is incremented by 1 for each location, until the upper right corner, labeled 100. A recording station can only be positioned on the corner of the grid. We assume that it covers any point located within a circular area, centered on the station, with a radius of two grid cells. We want to determine where we should locate the recording station (or truck) to minimize the number of times needed to move it to cover the whole area. The problem can be formulated as shown in Table 5.

TABLE 5

| | |
|---|---|
| Decision Variables: | $Y_k$, with $Y_k = 1$ if a recording truck needs to be set at position k at some point in time, k = 1, . . . , 100. |
| Objective: | Minimize the number of times the station needs to move, which is equivalent to minimizing the number of locations needed. |
| Constraint: | Each receiver location must be listened to. |

Figure 12:
FIG. 12 shows the algebraic formulation of the set of receiver locations covered by a recording station.

Another way to formulate the constraint, which yields the same results but makes the optimization problem easier, is to say that each receiver location must be listened to at least once. To code this constraint, we define patternK, the set of receiver locations that are covered by a recording station located in k as shown in FIG. 12, which shows the algebraic formulation of the set of receiver locations covered by a recording station. Pattern$_K$ is a column vector of a matrix. Each row of this matrix (index I) is associated with a receiver location. Each column (index k) is associated with a recording station potential location. In each column, a "1" indicates that the given receiver location (row) is covered by the recording station located at the given node (column), and a "0" indicates otherwise. The value of pattern$_{23}$ is given as an example in FIG. 12. For example, a receiver located in 12 is covered by a recording station located in k=23, but a receiver located in 11 is not. The problem is modeled as the objective function:

$$minimize_Y \sum_{k=1}^{100} Y_k$$

subject to the constraints:

$$\sum_{k=1}^{100} pattern_{lk} * Y_k \geq 1, l = 1, \ldots, 100$$

each receiver location must be covered at least once
$Y_k$=0,1 for k=1, . . . 1 100
where pattern$_{lk}$ is the Ith element of pattern$_k$.

It is important to note that if the shape of the area covered by the recording station is not circular for station k, pattern$_k$ can be modified to reflect the correct shape. The method can be extended to any terrain or grid shape by reformulating the covering patterns.

The objective function is now optimized subject to the set of constraints using an optimization program. The vectors patternK are stored in a data file which is read by the optimization program. Results indicate that the optimal number of station locations is 11. Multiple optimal solutions exist, for example locations (3,7,30,31,35,52,58,75,82,90 and 96) or (1,6,16,20,33,48,61,65,80,93 and 97), as shown in FIG. 11. These optimal solutions have different properties. For example, the total distance, computed here along the grid lines (rectilinear distances), to travel from each receiver location to the station which records its signal is smaller for the first solution optimal solution, represented with squares, than for the second optimal solution (162 distance units vs. 170). If the user wishes to minimize the number of moves of the recording station and the total distance between recording station locations and receiver locations, these two criteria can be put together in the objective function. The new objective function becomes:

$$minimize_Y \sum_{k=1}^{100} Y_k + \sum_{k=1}^{100} \sum_{l=1}^{100} dist_{lk} Y_k.$$

The distance between each receiver location I and the possible recording station k, dist$_{lk}$, may be computed separately, and stored in a second data file, used by the optimization program that solves the objective function. This addition is useful if the recording is done using cables to minimize the length of cables needed. This problem formulation has other potential applications on a land seismic survey. Examples include optimal placement of shots and receivers, optimal location of trouble shooting crews, and optimal location of the base camp or repair facilities.

Optimizing the Placement of Source Locations using a Location Model

Figure 13:
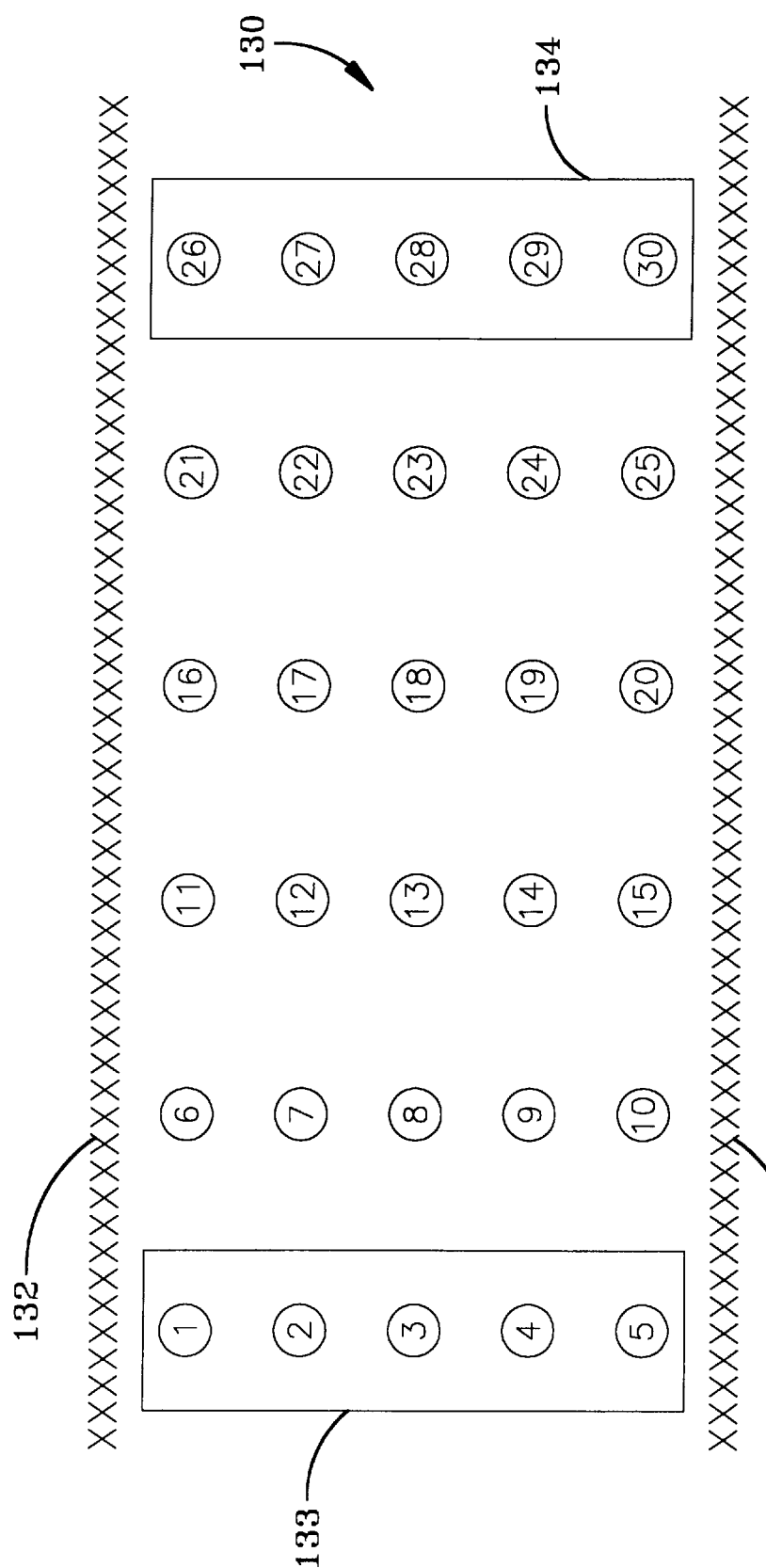
FIG. 13 shows a problem and solution for optimizing the placement of source locations subject to geophysical and operational constraints.

Another 3D seismic survey problem solved using mathematical programming techniques is optimizing the placement of source locations using a location model to minimize costs subject to geophysical and operational constraints. FIG. 13 shows the set of thirty potential shot locations 130 to be used to select an optimal set of shot locations. The set of potential shot locations 130 labeled 1 through 30 are represented on a grid in between two receiver lines 131 and 132. After the location problem has been modeled as an objective function and a set of constraints, the optimal solution for shot locations is determined and shown in FIG. 13. The optimal set of shot locations are those labeled 1 through 5 (133) and 25 through 30 (134). The model is formulated as shown in Table 6:

TABLE 6

| | |
|---|---|
| Assumptions | 1. An orthogonal grid such as that shown in Figs. 3 and 4 is specified on which source locations can be placed at the grid intersection points. Each grid intersection point will be called a node. Nodes are assigned a single unique identification number for notational purposes in the model.<br>2. An orthogonal grid is specified for the underground target layer that maps to the grid on the surface. Each square in the grid in the underground layer is called a bin. The bins are used to measure the sampling, i.e., the number of source signals that reflect off a particular region of the target layer. There are a total of K bins. Each bin has an offset distribution with G ranges and an azimuthal distribution with M range angles. |
| Problem Data | $N = \{1, 2, \ldots, n\}$ represents the set of potential source locations (nodes)<br>$c_i$ is the cost of locating a source at node $i \in N$. It includes preparation costs (e.g., surveying and drilling) and access costs.<br>$\phi_k$ represents the set of source locations that shoot into bin k, $k = 1, 2, \ldots, K$.<br>$f_k$ is the fold coverage for bin k, $k = 1, 2, \ldots, K$.<br>$\alpha_{kg}$ represents the set of source locations that shoot into bin k with an offset distance that falls into range g, $k = 1, 2, \ldots, K$, $g = 1, 2, \ldots, G$.<br>$\theta_{kg}^{(min)}$ ($\theta_{kg}^{(max)}$) is the minimum (maximum) fold coverage for bin k with offset distance that falls into range, g, $k = 1, 2, \ldots, K$, $g = 1, 2, \ldots, G$.<br>$\beta_{km}$ represents the set of source locations that shoot into bin k with an azimuth angle that falls into angle range m, $k = 1, 2, \ldots, K$, $m = 1, 2, \ldots, M$.<br>$\delta_{km}^{(min)}$ ($\delta_{km}^{(max)}$) is the minimum (maximum) fold coverage for bin k with azimuth angle that falls into angle range m, $k = 1, 2, \ldots, K$, $m = 1, 2, \ldots, M$. |
| Variables | $Y_i = 1$ if a shot is located on node i, 0 otherwise, $i \in N$. |

The problem is modeled as the objective function:

$$\text{Minimize} \sum_{i=1}^{n} c_i Y_i \text{ (minimize location costs of shot points)}$$

subject to the set of constraints $$\sum_{i \in \varphi_k} Y_i \geq f_k, k = 1, 2, \ldots, K \text{(Fold constraint)}$$

$$\theta_{kg}^{(max)} \geq \sum_{i \in \alpha_{kg}} Y_i \geq \theta_{kg}^{(min)}, k = 1, 2, \ldots, K, g = 1, 2, \ldots, G \text{(Fold Offset constraints)}$$

$$\delta_{km}^{(max)} \geq \sum_{i \in \beta_{km}} Y_i \geq \delta_{km}^{(min)}, k = 1, 2, \ldots, K, m = 1, 2, \ldots, M \text{(Fold Azimuth constraints)}$$

$$Y_i \in \{0, 1\}, 1 \leq i \leq n \text{(Integrality requirement)}.$$

The model is linear which makes it generally easier to solve than a nonlinear formulation. The model is based on the assumptions that offset and azimuth can be subdivided into ranges and that the quantities $f_k$, $\theta_{kg}^{(min)}$, $\theta_{kg}^{(max)}$, $\delta_{km}^{(min)}$, and $\delta_{km}^{(max)}$ can be input by the user or derived from user input. Selecting ranges requires some judgment on the part of the user. Selecting ranges too narrow will result in a large number of constraints with large data requirements. The current formulation contains a level of abstraction that must be resolved in order to create a model corresponding to an actual survey design. In particular, the sets $\phi_k$, $\alpha_{kg}$ and $\beta_{km}$ for $k=1, 2, \ldots, K$, $g=1, 2, \ldots, G$, $m=1, 2, \ldots, M$, must be specifically determined in order to completely specify the constraints.

The set of potential locations for adding shots may contain shot locations that have already been fixed. For example, in an offset problem where shots need to be relocated to avoid obstacles in the field, most shots are fixed and only a subset needs to be relocated. Since the model does not need to determine shot locations that have already been fixed, either the corresponding decision variable can be constrained to one or left out of the model altogether. From a computational standpoint, the latter option is better but requires adjustment of the fold, offset, and azimuth constraints to reflect the additional amount required instead of the total amount. Only bins and ranges modified by the exclusion points need to be considered, decreasing also the number of constraints in the model.

In this model, we assume that the potential shot locations 130 labeled 1 through 30 on FIG. 13 can be assigned a cost associated with locating a shot point. More specifically, we assume that each $c_i$ is an accurate representation of what it costs to have a source point located at node i on the grid. This necessitates the aggregation of data. The cost information may be better represented by modeling the routing cost explicitly, and necessitates the consideration of the location and vehicle routing model which follows.

Figure 14A:
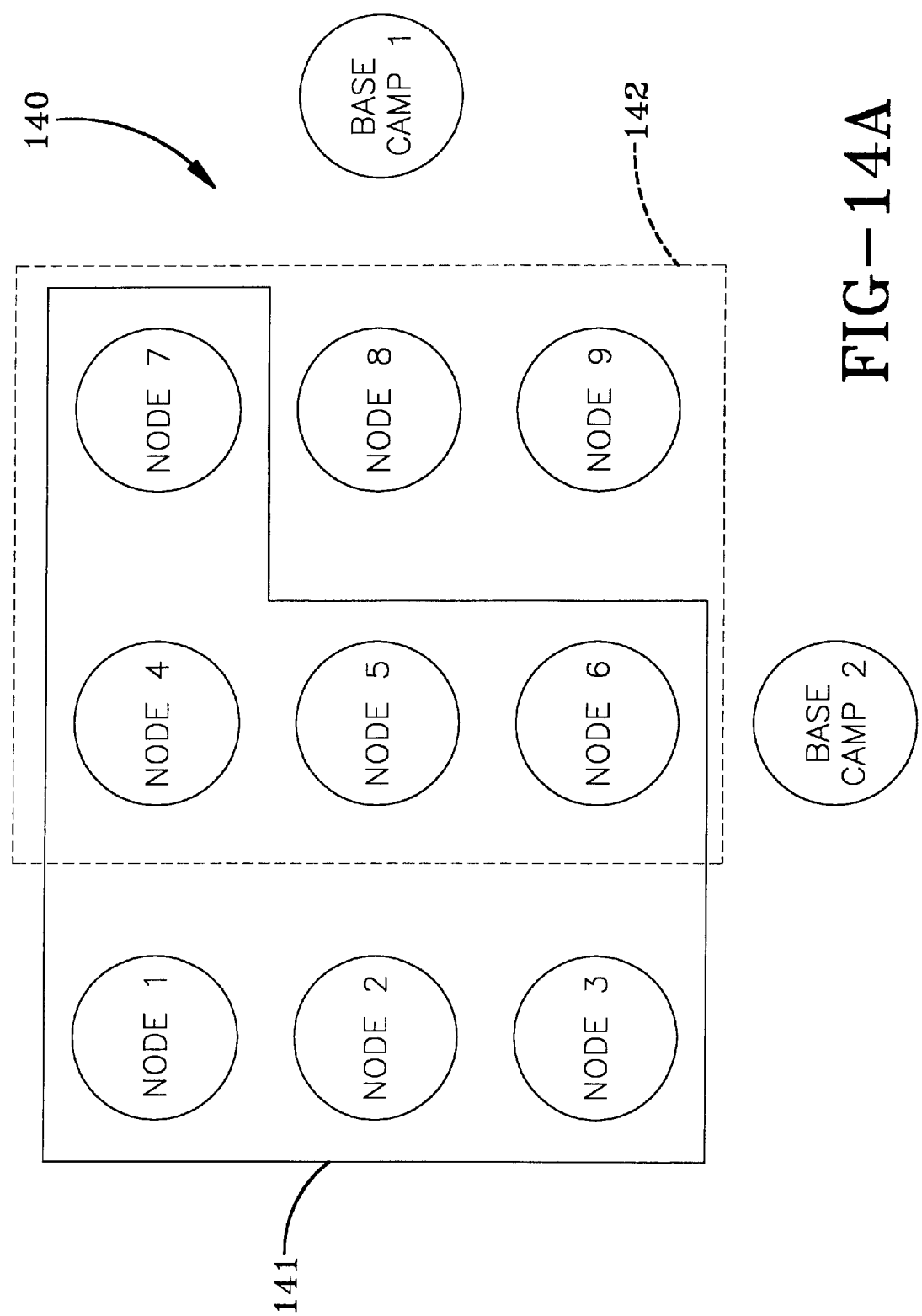
FIG. 14A shows a problem of optimizing source locations and vehicle routing.
Figure 14B:
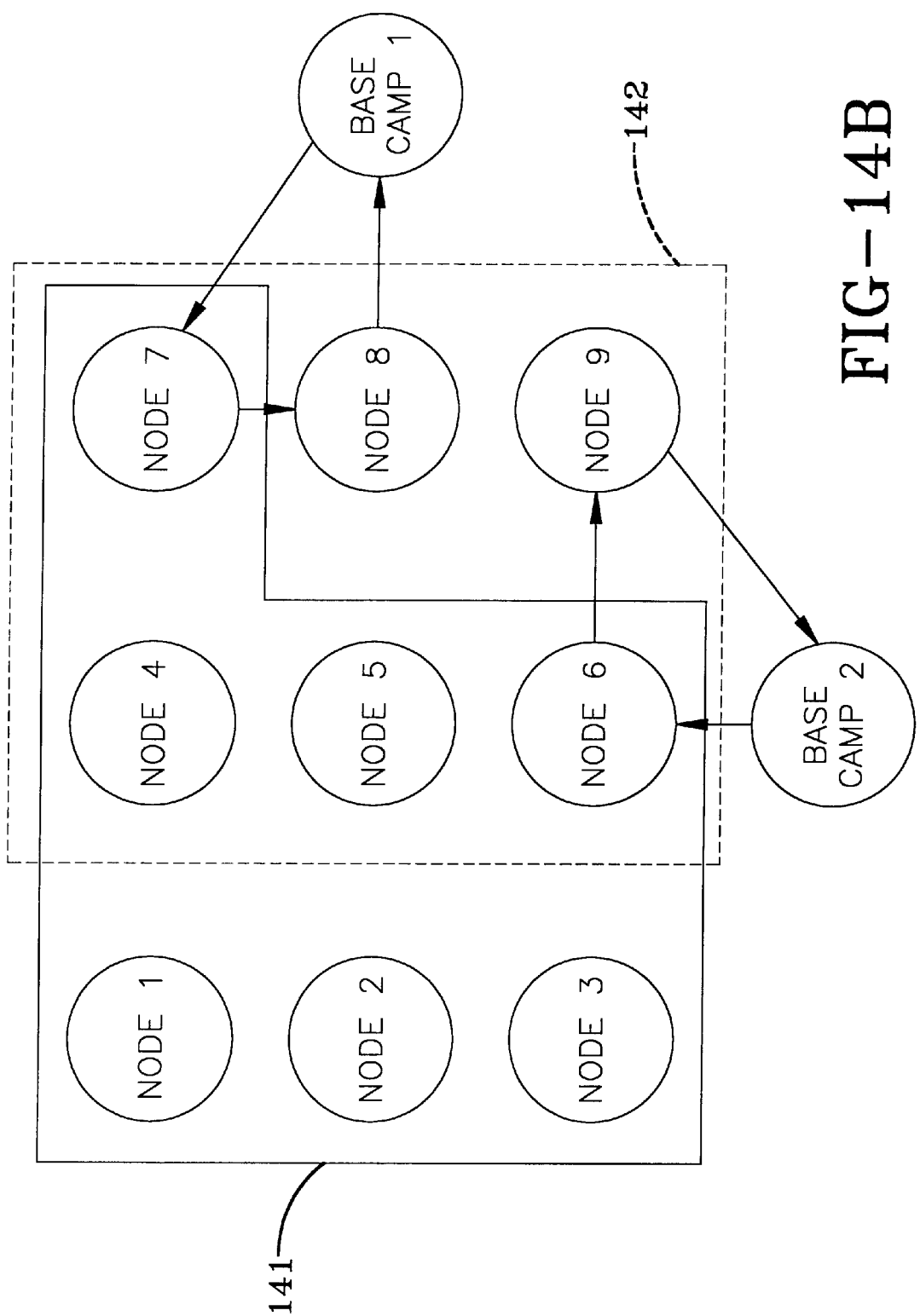
FIG. 14B shows the solution for optimizing the selections of source locations and optimal vehicle routing.

Optimizing the Placement of Source Locations, Sequence of Shots and Vehicle Routing Another 3D seismic survey problem solved using mathematical programming techniques is optimizing the placement of source locations and vehicle routing, including the sequence of shots. FIG. 14A shows a problem of optimizing source locations and vehicles routing with a set of nine potential shot locations 140 numbered vertically starting in the top left corner from 1 through 9. Base camps 1 and 2 are also shown. The number of source crews can vary, and in this instance the model is implemented for one or two crews. The first bin 141 includes nodes 1 to 7, and the second bin 142 includes notes 4 through 9. Two values are considered for the azimuth: horizontal and vertical (angles of 0, 90, 180 and 270 degrees), and diagonal (angles of 45, 135, 225 and 335 degrees). Only two values are considered for the offsets also: 1 for neighboring nodes, and 1.4 for neighboring nodes on a diagonal. One shot per bin is required. The values of minimum and maximum fold coverage are not restrictive on the choice of the set of shot locations. FIG. 14B shows the resulting solution. The solver selects base camp 2 and shot nodes 6 and 9 going from the base camp to node 6, then from node 6 to node 9 and then back to base camp 2. Due to symmetry in the model, many alternative optimum solutions exist such as base camp 2 to node 3 to node 6 and back to base camp 2; base camp 1 to node 7 to node 8 and back to base camp 1; and base camp 1 to node 8 to node 9 and back to base camp 1.

In generating optimal solutions for the problem shown in FIGS. 14A and 14B, the model is formulated as shown in Table 7.

TABLE 7

| | |
|---|---|
| Assumptions | 1. An orthogonal grid such as that shown in Figs. 3 and and 4 is specified on which source locations can be placed at the grid intersections points. Each grid intersection point is called a node. Nodes are assigned a single unique identification number for notational purposes in the model.<br>2. An orthogonal grid is specified for the underground target layer that maps to the grid on the surface. Each square in the grid in the underground layer is called a bin. The bins are used to measure the sampling, i.e., the number of source signals that reflect off a particular region of the target layer. There are a total of K bins. Each bin has an offset distribution with G ranges and an azimuthal distribution with M range angles.<br>3. Routing must include all the nodes to be visited. Therefore, all the shot point locations not in an exclusion zone must be included in this model. If a shot point location has already been decided on, the corresponding location decision variable is set to 1, but is not removed from the model.<br>4. Transportation is defined for a single shooting crew or vibrator set. The model can be generalized to multiple crews and sets.<br>5. Arcs are directed which permits consideration of different costs on arcs from i to j and j to i.<br>6. The base camp is chosen during the optimization process and is not changed during the operations. |
| Problem Data | $N = \{1, 2, \ldots, n\}$ represents the set of potential source locations (nodes).<br>$c_i$: is the preparation cost associated with locating a source at node $i \in N$ (e.g. surveying, drilling).<br>$\kappa_{ij}$ is the cost of the source crew traveling from node $i \in N$ to node $j \in N$. If no arc exists between nodes i and j, this this cost is set to $\infty$.<br>BC represents the set of possible base camp locations.<br>$\phi_k$ represents the set of source locations that shoot into bin k, $k = 1, 2, \ldots, K$.<br>$f_k$ is the fold coverage for bin k, $k = 1, 2, \ldots, K$.<br>$\alpha_{kg}$ represents the set of source locations that shoot into bin k with an offset distance that falls into range g, $k = 1, 2, \ldots, K, g = 1, 2, \ldots, G$.<br>$\theta_{kg}^{(min)}(\theta_{kg}^{(max)})$ is the minimum (maximum) fold coverage for bin k with offset distance that falls into range g, $k = 1, 2, \ldots, K, g = 1, 2, \ldots, G$.<br>$\beta_{km}$ represents the set of source locations that shoot into bin k with an azimuth angle that falls into angle range m, $k = 1, 2, \ldots, K, m = 1, 2, \ldots, M$.<br>$\delta_{km}^{(min)}(\delta_{km}^{(max)})$ is the minimum (maximum) fold coverage for bin k with azimuth angle that falls into angle range m, $k = 1, 2, \ldots, K, m = 1, 2, \ldots, M$. |
| Variables | $Y_i = 1$ if a source or base camp is located on node i, 0 otherwise, $i \in N$.<br>$X_{ij} = 1$ if the source crew travels from node i to node j, 0 otherwise, $i, j \in N$. |

The problem is modeled as the objective function:

$$\text{Minimize} \sum_{i=1}^{n}\sum_{j=1}^{n} \kappa_{ij} X_{ij} +$$

-continued $$\sum_{i=1}^{n} c_i Y_i \text{ (minimize route and location costs of source points)}$$

subject to the set of constraints:

$X_{ij} \leq Y_j$, $\forall i,j \in N$, (Route possible if the source location from which it originates is selected)

$X_{ij} \leq Y_j$, $\forall i,j \in N$ (Route possible if the source location at which it ends is selected) $\Sigma X_{ij} \geq Y_j$, $\forall j \in N$ (Source crew enters a selected source node at least once)

$$\sum_{j=1}^{n} X_{ij} = \sum_{j=1}^{n} X_{ji,1} \forall i \in N \text{(Conservation of flow at node } i\text{)}$$

$$\sum_{i \in BC} Y_i = 1 \text{(Select one and only one base camp)}$$

$$\sum_{i \in S}\sum_{j \in S} X_{ij} \leq |S| - 1, S \subset N, 2 \leq |S| \leq n - 2$$

(Sub-tour elimination constraints)

$$\sum_{i \in \varphi_k} Y_i \geq f_k, k = 1, 2, \ldots, K \text{(Fold constraint)}$$

$$\theta_{kg}^{(max)} \geq \sum_{i \in \alpha_{kg}} Y_i \geq \theta_{kg}^{(min)}, k = 1, 2, \ldots, K, g = 1, 2, \ldots, G$$

(Fold Offset constraints)

$$\delta_{km}^{(max)} \geq \sum_{j \in \beta_{km}} Y_i \geq \delta_{km}^{(min)}, k = 1, 2, \ldots, K, m = 1, 2, \ldots, M$$

(Fold Azimuth constraints)

$X_{ij} \in \{0, 1\}, 1 \leq i < j \leq n$(Integrality requirement)

$Y_i \in \{0, 1\}, 1 \leq i \leq n$(Integrality requirement).

Sub-tour elimination constraints eliminate solutions featuring paths or sets of arcs isolated from the base camp. Since these formulations contain $O(2^n)$ number of constraints, it is often impossible to solve the above formulation, even for moderate values of n. Instead the model is usually relaxed and solved by means of specialized algorithms. For example, it is often the case that only a small number of sub-tour elimination constraints are required for a given problem in practice. Thus, these constraints are usually added in an iterative scheme: the model is optimized, sub-tours identified, and the constraints needed to eliminate them are added.

Figure 15:
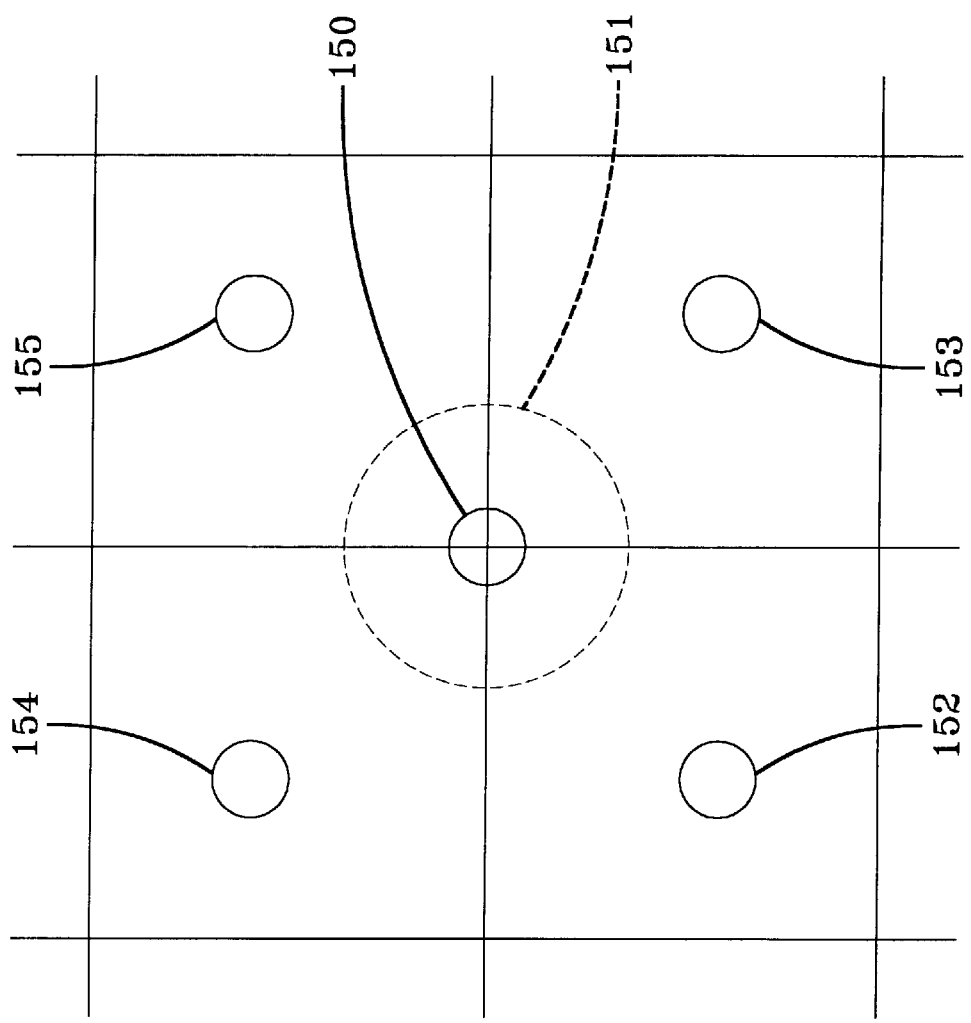
FIG. 15 shows an offset problem and optimal solutions for offsetting a source point to avoid obstacles.

Offsetting the Placement of Source Locations from an Original Survey Design to Avoid Obstacles Another 3D seismic survey problem solved using mathematical programming techniques is an offset problem, which is an addition to the location and vehicle routing problem, where source points are offset from an original survey design to avoid obstacles, such as wells in the field. FIG. 15 shows a typical offset problem where a source point 150 is located, but must be offset to avoid obstacles represented by the circle enclosed by dashed lines 151. After optimizing, the model selects at least one of the four alternative source location points shown 152–155 to replace the excluded point 150. Unlike other location and location/vehicle routing problems, this model does not require the offset source points to rest on a node within an orthogonal grid. The model is formulated as shown in Table 8.

TABLE 8

| | |
|---|---|
| Assumptions | 1. An initial survey design is defined on an orthogonal grid such as that shown in Figs. 3 and 4 with sources located at the grid intersection points. Each grid intersection point will be called a node. Nodes are assigned a single unique identification number for notational purposes in the model and their (x, y) coordinates are known.<br>2. The model is developed for a two-dimensional map and may be extended to a three dimensional map.<br>3. For each shot point located in an exclusion zone, it is possible to find and list a finite number of alternative source point locations which makes the problem discrete. The alternative source point locations do not have to be located at the grid intersection points.<br>4. The distance between two shot point locations is a measure of the cost of traveling from one point to the other. If this is not true, the distance matrix can be adapted to represent an appropriate cost. Properties of the distance matrix have an influence on the performance of the algorithms used to optimize the model.<br>5. The triangle inequality holds for the distance matrix, i.e., there is no shortest way to go from a location i to a location j than to follow the arc between i and j and this hypothesis influences the type of algorithms used to solve the problem.<br>6. An orthogonal grid is specified for the underground target layer that maps to the grid on the surface. Each square in the grid in the underground layer is called a bin. The bins are used to measure the sampling, i.e., the number of source signals that reflect off a particular region of the target layer. There are a total of K bins. Each bin has an offset distribution with G ranges and an azimuthal distribution with M range angles.<br>7. Transportation is defined for a single shooting crew or vibrator set. The model can be generalized to multiple crews and sets.<br>8. Arcs are directed which permits consideration of different costs on arcs from i to j and j to i.<br>9. The base camp has already been chosen. |
| Problem Data | S represents the set of source locations excluding the alternate locations for points in the exclusion zone.<br>S* represents the set of source locations in an exclusion zone, S* ⊆ S.<br>$L_j$ represents the set of alternative locations for source point I, I ∈ S*.<br>N = S ∪ ($\Sigma_{i \in S}$ · $L_i$) represents the set of potential source locations (nodes).<br>$d_{il}$ is the cost of using alternative location I for source point I, I ∈ $L_i$, I ∈ S.<br>$f_k$ is the fold coverage for bin, k = 1, 2, ..., K.<br>$\theta_{kg}^{(min)}$($\theta_{kg}^{(max)}$) is the minimum (maximum) fold coverage for bin k with offset distance that falls into range g, k = 1, 2, ..., K, g = 1, 2, ..., G.<br>$\delta_{km}^{(min)}$($\delta_{km}^{(max)}$) is the minimum (maximum) fold coverage for bin k with azimuth angle that falls into angle range m, k = 1, 2, ..., K, m = 1, 2, ..., M. |
| Variables | $Y_{il}$ = 1 if alternate location I is chosen to replace source location i, 0 otherwise, I ∈ $L_i$, i ∈ S*.<br>$X_{ij}$ = 1 if the source crew travels from node i to node j, 0 otherwise, i, j ∈ N. |

In addition to the above, this model also uses $z_1$'s, which are not decision variables per se, but are handy in clarifying the notations for the geophysical constraints. The vector Z has $$|S| - |S^*| + \sum_{i \in S^*} |L_i|$$

components, one per alternative location, where |S| indicates the cardinality of a set. Z is built as follows: for each shot point not located in an exclusion zone (i∈S\S*), an element is set to 1; for each shot point located in an exclusion zone (i∈S*), |$L_i$| elements are added to Z, set to 1 if the alternative location l is chosen to replace point i($Y_{il}$=1) and to 0 otherwise, l∈$L_i$. For example: let us have 4 nodes, and node 3 is in an exclusion node. Four locations are proposed for node 3, and the second one is chosen (i.e., $Y_{32}$=1, and $Y_{31}$=$Y_{33}$=$Y_{34}$=0). It yields:

$$Z = \begin{pmatrix} 1 \\ 1 \\ Y_{31} \\ Y_{32} \\ Y_{33} \\ Y_{34} \\ 1 \end{pmatrix} = \begin{pmatrix} 1 \\ 1 \\ 0 \\ 1 \\ 0 \\ 0 \\ 1 \end{pmatrix}.$$

The variable Z is used to define the following problem data for the geophysical constraints:

$pat_k$ represents the set of source locations shooting into bin k, k with offset distance that falls into range g, k=1, 2, ..., K;

$pat_{kg}$ represents the set of source locations shooting into bin k with offset distance that falls into range g, k=1, 2, ..., K, g=1, 2, ..., G;

$pat_{km}$ represents the set of source locations shooting into bin k with azimuth angle that falls into angle range m, k=1, 2, ..., K, m=1, 2, ..., M.

Additional data for the problem are defined as follows:

$h_i$ and $v_i$ are the coordinates of shot location i. The coordinates of the shot location located originally in an exclusion zone vary as a function of the location of the selected alternative position. A way to store information to deal with this computation is to store H data, the vector of horizontal data, as follows: first, store the coordinates for the shot points not located in an exclusion zone. This fills the first |S\S*| elements of vector H data. Then, store the coordinates of the alternative locations for each shot point in an exclusion zone. Coordinates for the alternatives of the first shot pint in sn exclusion zone for example will then be stored from $hdata_{|S\setminus S^*|+1}$ to $hdata_{|S\setminus S^*|+|Lelem(1)|}$, where elem (1) is the index of the first element in S*. The total number of elements in H data is $$|S \setminus S^*| + \sum_{j \in S^*} |L_j|.$$

Then, $$h_i = \begin{cases} hdata_{i - \sum_{j=1}^{j=|S^*|} I_{elem(j)<i}}, & \text{if } i \in S \setminus S^*, \\ \sum_{j=1}^{j=|L_i|} y_{ij} hdata_{|S\setminus S^*| + \Sigma_{k \in S^* \atop k<i} |L_k| + j} & \text{if } i \in S^*, \end{cases}$$

where $I_{elem(j)<i} = \begin{cases} 1 & \text{if } elem(j) < i, \\ 0 & \text{otherwise.} \end{cases}$ The same storing method is used for Vdata, the vector of vertical data, and an inequality similar to the above gives each vertical coordinate $v_i$, i∈S.

$\mu_{ij}$, the cost of traveling from node i to node j, i, j∈N. Assuming this cost is proportional (constant α) to the distance between the points, and let dist($h_i$, $v_i$, $h_j$, $v_j$) be the function computing the distance, where ($h_i$, $v_i$) and ($h_j$, $v_j$) are the coordinates of shot point i and j respectively. Then:

$$\mu_{ij} = \alpha dist(h_i, v_i, h_j, v_j);$$

Examples of distance functions are shown in Table 9:

TABLE 9

| | |
|---|---|
| $\sqrt{(h_i - h_j)^2 + (v_i - v_j)^2}$, | (Euclidean distance) |
| $\|h_i - h_j\| = \|v_i - v_j\|$, | (Manhattan distance) |
| $\max(h_i - h_j, \|v_i - v_j\|)$, | (Chebyshev's distance) |
| $\sqrt{(h_i - h_j)^2 + (v_i - v_j)^2} +$ | (Affine metric distance) |
| $0.5(h_i - h_j)(v_i - v_j)$ | |

The objective function minimizes the total transportation cost. If the alternative locations have different costs, a location cost can be added $$\left(\sum_{i \in S^*} \sum_{l \in L_i} d_{il} Y_{il}\right).$$

If the costs are equal, this term is a constant and can be dropped from the objective function to simplify the model. The objective function can therefore be stated as:

$$\text{minimize}_{XY} \sum_{\in N} \sum_{j \in N} \mu_{ij} X_{ij} \left(+ \sum_{i \in S^*} \sum_{l \in L_i} d_{il} Y_{il}\right).$$

(minimize total transportation and offset location costs)

subject to the set of constraints:

$$\sum_{i \in L_i} Y_{il} = 1, \forall\, i \in S^*$$

(An alternative location must be used to replace source location $i$.)

$$X_{ij} \leq Y_{jl}, \forall\, i \in N, j \in S^*, l \in L_j$$

(Go only to the selected alternative location)

$$\sum_{j \in S} X_{ij} \geq 1, \forall\, i \in S/S^*$$

(The tour must leave each source point location)

$$\sum_{i \in L_k} X_{ij} \geq 1, \forall\, k \in S^*, j \in N$$

(The tour must leave each replacement location)

$$\sum_{i \in N} X_{ij} - \sum_{i \in N} X_{ji} = 0, \forall\, j \in N$$

(Conservation of flow constraints)

$$\sum_{i \in S} \sum_{j \in S} X_{ij} \leq |Q| - 1, Q \subset N, 2 \leq |Q| \leq |N| - 2$$

(Sub-tour elmination constraints)

Since the model has $|K|$ fold coverage constraints, $|K\|G|$ offset constraints and $|K\|M|$ azimuth constraints, solving the problem is made difficult by the high number of geophysical constraints. There are alternative formulations, such as constraints on $X_{min}$, the largest minimum offset, $X_{max}$, the largest recorded offset, and formulating differently the azimuth constraints. The formulations discussed below assume that the initial design respects the geophysical constraints, and concentrates on the changes produced by the new shot point locations.

Constraints may be placed on $X_{min}$, where $X_{min}$ is the length of the diagonal of a rectangle bounded by two source lines and two receiver lines. Let $X_{min}$ be the largest minimum offset accepted and B be the set of rectangles with at least one corner in an exclusion zone (i.e., one corner belongs to $S^*$). There are four rectangles per shot point in an exclusion zone. Only one diagonal needs to be computed per shot point in an exclusion zone, though, determined by the value of $Y_{il}$, $i \in S^*$, $L \in L_i$. So we have $|S^*|$ inequalities of the form:

$$\text{diagonal}(a,b,c,d) \leq X_{min},$$

where a,b,c,d are the corners of the rectangle, with coordinates (*x,*y), and diagonal () the function computing $X_{min}$, i.e.:

$$\text{diagonal}(a,b,c,d) = \max(\sqrt{(c_x - a_x)^2 + (c_y - a_y)^2}, \sqrt{(d_x - b_x)^2 + (d_y - b_y)^2}).$$

Constraints may be placed on $X_{max}$, where $X_{max}$ is half the diagonal of a patch. The same technique as above can be used, centered on patches rather than rectangles. Constraints may also be placed on the azimuths. When an alternative location is selected, four azimuths change, one in each rectangle having the new point as a corner. So an azimuth cannot change by more than $\pm 4|S^*|$. The azimuths can be computed when the alternative locations are known, and counters can be set to ensure the requirements.

These formulations present advantages over the previous ones because (1) the number of constraints is much smaller than in the previous formulation, making the problem less complex and easier to solve; and (2) there is no quantity to estimate: $x_{min}$ and $x_{max}$ can easily be given by the user. However, they rely on a definition which might be limited to the surface, and therefore not be strong enough to represent the geophysical constraints of the survey. In this case, the model using the new formulation rather than the previous one would be a relaxation of the original problem, giving an objective function and decision variables more or less close to the optimal solution.

This model forces the crew/vibrator set to visit each shot point at least once. Client requirements may allow shot points to be skipped. The following changes to the model can be made to allow for shot point locations to be skipped:

Add parameter $e_i$, the cost of using shot location $i \in S \backslash S^*$;

Add decision variable $w_i$, set to 1 if a shot is done at location i, and 0 otherwise, $i \in S \dagger S^*$;

Add a term to the objective function:

$$\sum_{i \in S \backslash S^*} e_i * w_i;$$

Remove the requirement of selecting an alternative location for nodes in S* by replacing the alternative location to replace shot location i with $$\sum_{l \in L_i} y_{il} \leq 1, i \in S^*.$$

(An alternative location may replace shot location $i$)

Adequately determining the geophysical constraints is very important because the geophysical constraints now become the only ones forcing a routing through the nodes. Another way to ensure that enough shot locations will be visited is to add the following constraint:

$$\sum_{i \in S \setminus S^*} w_i + \sum_{i \in S^*} \sum_{l \in L_i} y_{il} = |S| - p.$$

The resulting model is very large, and difficult to optimize. If too large, the problem can be decomposed into two problems: a location problem followed by a transportation problem. First, the shot point locations are chosen. Then, routing between the points is optimized. The results will not be globally optimum because the location and routing decisions are taken separately, but these results may still be of interest.

Optimizing Source Location and Vehicle Routing along with Receiver Equipment Layout Operational Constraints Another 3D seismic survey problem solved using mathematical programming techniques is optimizing shot location and vehicle routing together with the operational constraints associated with the receiver equipment layout. Incorporating receiver equipment layout constraints requires a much more sophisticated model formulation. It also leads to a larger scale model that is even harder to solve to optimality than the combined location and vehicle routing model discussed previously. To overcome the problems with solving a larger scale model to optimality, one approach to incorporating receiver equipment constraints is an extension of a restricted form of the location and vehicle routing model.

Figure 16:
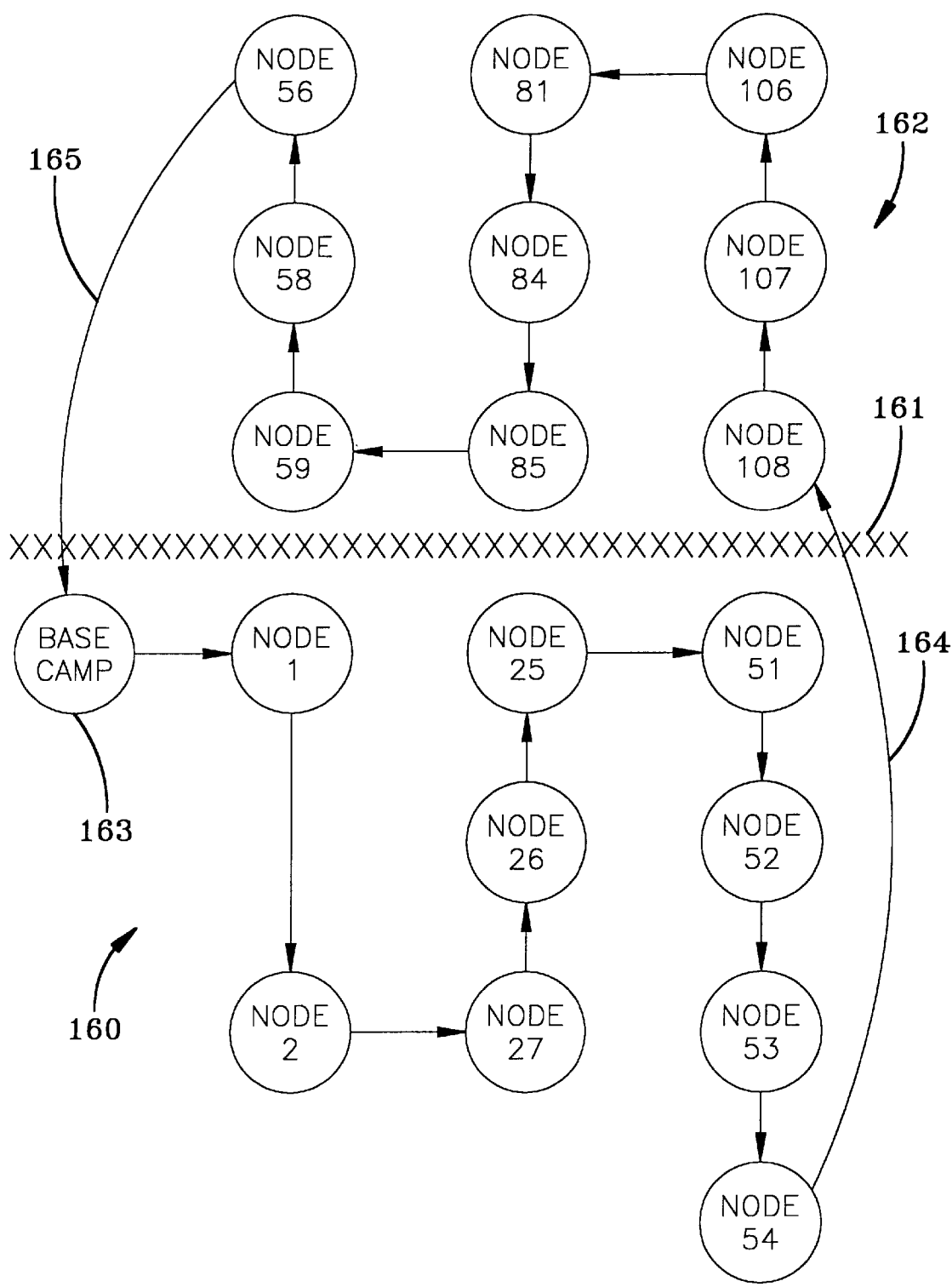
FIG. 16 shows the incorporation of receiver equipment layout constraints into a source location and routing problem and an optimal solution.

FIG. 16 shows the incorporation of receiver equipment layout constraints into a source location and routing problem along with an optimal solution. In FIG. 16, a set of source locations 160 which includes nodes 1, 2, 25, 26, 27, 51, 52, 53, 54 are located on one side of a receiver line 161. Another set of source locations 162 are located on the opposite side of the receiver line 161 and include nodes 56, 58, 59, 81, 84, 85, 106, 107 and 108. A base camp 163 starting and ending position for the survey is located on one side of the receiver line. Limited receiver equipment restricts (or penalizes) certain movements of the source crew(s) across the receiver line 161. Penalties can be incorporated into the location and vehicle routing model by adjusting the cost coefficients (i.e., $\kappa_{ij}$) on routes across the receiver lines 161 that would represent expensive equipment movements. For example, crossing a receiver line 161 to shoot a source location might require the movement of an entire receiver line from the back to the front of spread layout in order to set up the necessary active set of receivers. Expensive line crossings may depend on the survey design and the amount of receiver equipment available.

To solve this difficulty, the model is restricted to a fixed initial starting point (base camp 163) that goes directly to a single point on the survey node 1, which is the closest point to the base camp. We assume that the receivers are laid out on parallel lines 161 on the grid defined for the potential source locations. Additionally, we assume that the following information is fixed and given: (1) the total number of receiver channels; (2) the number of channels/receiver line; and (3) the number of active receiver lines. Items 1 and 2 can be used to calculate the total number of receiver lines. The latter can be compared with item 3 to determine the number racks that can be shot in a sequence on a single shot line without an expensive move of receiver equipment. A rack is defined as the number of shots on a single shot line between two adjacent receiver lines. It is assumed that all shots in a rack shoot into the same set of active receivers. The cost coefficients that correspond to an expensive receiver line crossing are adjusted to reflect the additional cost. One could compensate for the restrictions to a certain extent by running different scenarios for the location base camp and the other three items. The procedure of adjusting the cost coefficients may be easily automated for a regular survey design. For irregular designs, automation might be difficult and individual consideration of the cost coefficients may be necessary. In practice, a combination of the two (automation with some adjustment) would be necessary for most surveys since most designs start from a regular base and are adjusted for local irregularities such as exclusion zones. In the resulting optimization also shown in FIG. 16, the number of crossings of the receiver line 161 is limited to two: the path 164 going from node 54 to node 108, and the path 165 and going from node 56 back to base camp 163. This limits the number of times the receiver equipment must be moved and optimizes cost.

Optimal Purchase of an Expendable Item for a Seismic Survey

Another 3D seismic survey logistic operations problem solved using mathematical programming techniques is amount of gas to be purchased for equipment operations before starting a survey. This problem involves a stochastic problem, that is, the problem data are not known with certainty, but have a known probability distribution function. One of the most studied class of problems in stochastic programming is the two-stage stochastic model: the decision maker has to take a decision now (first stage) not knowing what the future will be. When the future occurs, the decision maker can adjust his decision (second stage), at a certain cost. Consider, for example, that the decision to be made is the amount of gas to be purchased for equipment operations before starting a survey, i.e., now. As the terrain is not known with certainty, the amount of gas needed, d, is not known with certainty either. Going around canyons and creeks increases the gas consumption. If the decision maker buys too much gas, the extra gas is sold back to the gas company, at 70% of the initial price. If, on the contrary, the amount of gas reserved is not sufficient, the decision maker can ask the gas company to deliver more gas to the local distributor, and buy this gas, at a price higher ($c_2$) than the current price ($c_1$), due to transportation and local distribution costs. This problem can be formulated as shown in Table 10.

TABLE 10

| Decision variables: | *X, the amount of gas to be purchased now.<br>*Y, the amount of gas to be purchased later. |
|---|---|
| Objective: | Minimize the total cost, i.e., the sum of the costs of buying gas now and later. |
| Constraints | *The demand in gas must be satisfied.<br>*The quantities bought must be positive. |

Technically speaking, Y, the amount of gas to be purchased later, is not a decision variable. Once X, the amount of gas to be purchased now, has been chosen, and the future has occurred, Y is the quantity needed to react to what happened and is thus completely determined by X and what happened.

The problem is modeled as the objective function and constraints:

minimize$_x$($c_1$* X+E[h(X,d)]) (first stage)
subject to X$\geq$0,
with h(X,d)=$c_2$*Y−0.7*$c_1$*(X+Y−d) (second stage)
subject to:
X+Y$\geq$d (demand must be satisfied)
Y$\geq$0.

In the above formulation, E is the expectation operator. An attempt is made to minimize the average total cost whatever the realization of the demand d in the future. The recourse decision, Y, is proportional to the unsatisfied demand: this is called a "simple" recourse.

Figure 17:
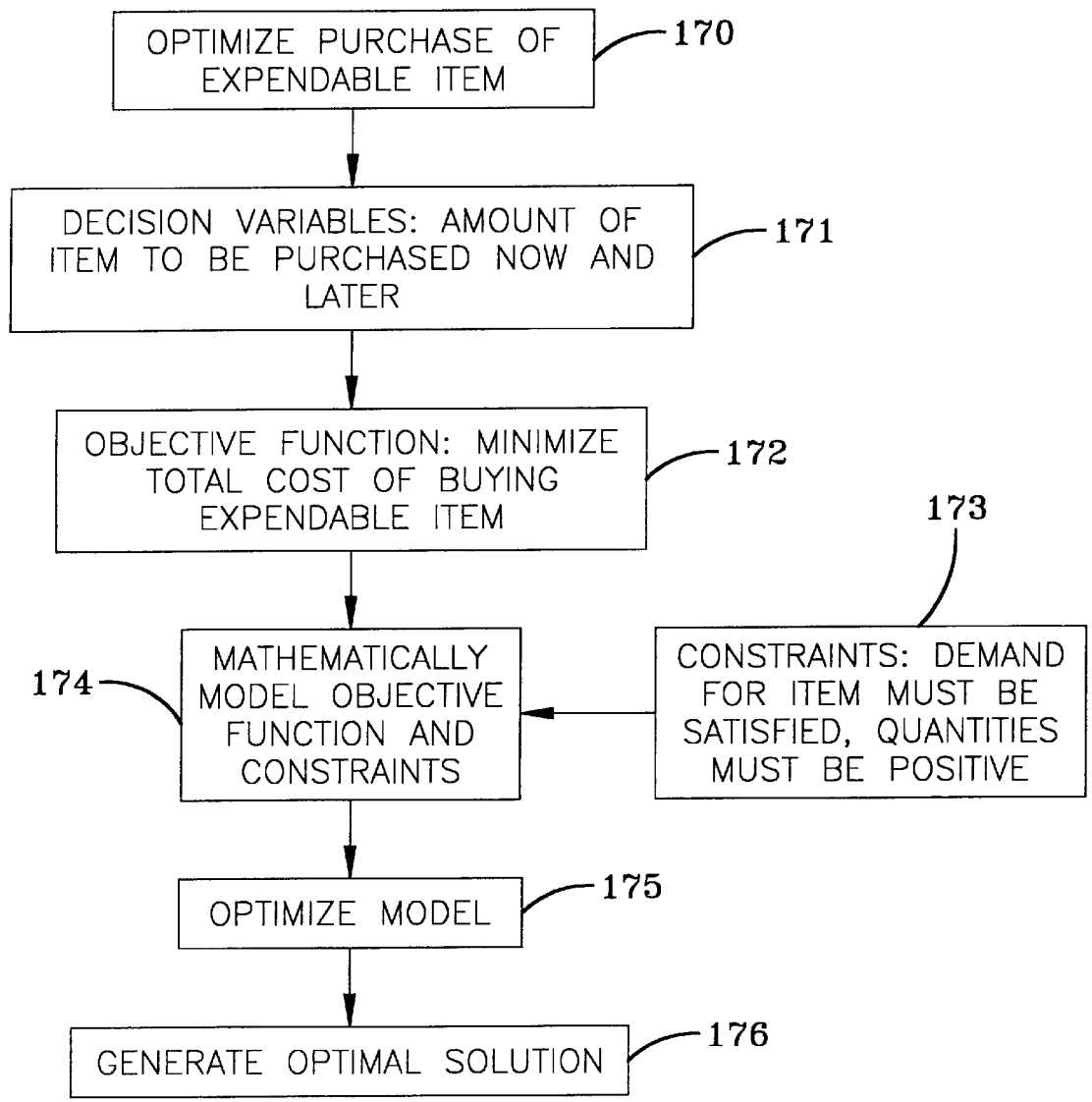
FIG. 17 is a flow diagram for optimizing the purchase of an expendable item.

FIG. 17 is a flow diagram for optimizing the purchase of an expendable item 170. The decision variables are determined, which are the amount of gas to be purchased now and later 171. An objective function is built that minimizes the total cost of buying an expendable item 172. Constraints 173 are determined: the demand for gas must be satisfied and the quantities bought must be a positive number. The logistical problem of optimizing the purchase of an expendable item is mathematically modeled and expressed as an objective function and set of constraints 174. The objective function is optimized subject to the constraints 175 and an optimal solution is generated 176.

In this example, consider that only the demand is random, and can take 5 different values (500, 850, 1000, 1150 and 1300 gallons), with the same probability (p=0.2). In the model, the expectation operator is expanded in the objective function. Let S be the set of scenarios, i.e., the set of different values of d, d(s). The decision variable Y is noted Y(s), the value of Y when d=d(s). There are as many Y(s) as there are scenarios. One constraint is written for each scenario. The problem is modeled as the objective function:

$$\min_{X,Y}\left(c_1 * X + \sum_{s \in S} P(d = d(s)) * (c_2 * Y(s) - 0.7c_1 * (X - Y(s) - d(s)))\right)$$

subject to a set of constraints:

$X+Y(s) \geq d(s)$ $X \geq 0$ $Y(s) \geq 0$.

The cost of buying gas later is considered to be twice the price of buying gas now. Results indicate that the decision maker should buy 1150 gallons of gas now (for a total cost of $528). If the demand turns out to be higher, the decision maker will then buy the extra gas from the local distributor. If the demand is lower, the extra gas is refunded at 70% of the original price by the gas company. This scenario is called first scenario in the discussion below. Assume now that the probabilities are changed so that low demands are more probable (scenario low), or, symmetrically, high demands more probable (scenario high). New probabilities are given for each of these scenarios in Table 11.

TABLE 11

|  | Scenario low | Scenario high |
| --- | --- | --- |
| P(d = 500) | 0.4 | 0.1 |
| P(d = 850) | 0.3 | 0.1 |
| P(d = 1000) | 0.1 | 0.1 |
| P(d = 1150) | 0.1 | 0.3 |
| P(d = 1300) | 0.1 | 0.4 |

In scenario low, the value of X decreases to 1000 gallons for an expected cost of $459.25. Since the probability of getting a high demand is low, less gas needs to be purchased in the first-stage than previously. On the other hand, due to the high cost of gas in the second-stage, enough gas is bought to face the demand 80% of the time. For scenario high, X increases to 1300 gallons, for an expected cost of $580. Following the same reasoning, it is wiser to buy in the first-stage enough gas to face a high demand, because it costs less in an average to resale excess gas than face a likely shortage.

Consider now that the decision maker can only buy full tanks of gas from the oil company. A tank contains 150 gallons of gas. The problem is now a stochastic model with integer first-stage decision variables that represent the number of tanks of gas purchased. Additionally, $c_1$ is changed from cost per gallon to cost per tank. Consider that the demand can take the different values with the same probability. The decision maker should now buy 8 full tanks of gas (1200 gallons), thus 50 gallons more than previously, for an expected cost of $595. It is interesting to notice that the solution found is as close as possible to the solution of the first scenario. Consider now that 3 types of tanks are available, of capacities 100, 150 and 175 gallons. In this case, the variable X is replaced by three decision variables that represent the number of each size of tank purchased. The optimal solution is to one tank of 100 gallons and 7 tanks of 150 gallons (so a total of 1150 gallons) for an expected cost of $528, as previously. Let now the cost of gas per gallon decrease as the size of the tank increases. The solution reflects the discounted price: the best action consists of buying 7 tanks of 175 gallons (the largest tank and thus the smallest cost), for a total of 1225 gallons and $323.7. Lower costs in the first-stage implies a decrease in willingness to risk not meeting the demand and having to purchase gas later.

In this example, the demand is a discrete random variable. A variation of this problem is to use a continuous distribution. Such problems can be solved using Monte-Carlo sampling to approximate the distribution. It is also possible to extend this example by introducing random costs.

Other applications of stochastic programming exist in land seismic surveying operations. For example, equipment procurement on a survey sometimes involves the decision of purchasing new equipment versus procuring used, possibly less reliable equipment from other crews or other parts of the world. Most of the examples could be formulated as stochastic models if some of their parameters are random.

Although the present invention has been described in detail with reference to certain preferred embodiments, other embodiments are possible. Therefore, the spirit and scope of the appended claims should not be limited to the description of the preferred embodiments herein.

What is claimed is:

1. A method for modeling and optimizing logistical operations problems in land seismic survey operations, in a computer program running on a computer processor, the method comprising the steps of:

a. formulating a logistical problem with a set of decision variables and problem data;

b. modeling the problem as an objective function and a set of constraints expressed in terms of the problem data and the decision variables; and c. solving the objective function and generating an optimal solution for the set of decision variables to optimize the logistical problem.

2. A method for modeling and optimizing logistical operations problems in land seismic survey operations, in a computer program running on a computer processor, the method comprising the steps of:

a. identifying decision variables under the control of a user for a logistical problem;

b. identifying geophysical and operational constraints for the logistical problem;

c. identifying variable logistical problem parameters;

d. building a mathematical model of the logistical problem, the model being expressed as an objective function and a set of constraints in terms of the decision variables and problem parameters; and e. generating an optimal logistical problem solution.

3. The method according to claim 2, further comprising:
   a. translating the mathematical model into a form suitable for solution by a solver software program; and
   b. in the generating an optimal logistical problem solution step, using the solver software program to solve for the decision variables which satisfy the problem constraints and optimize the objective function.

4. The method according to claim 3, wherein:
   a. the objective function and the set of constraints are expressed in an algebraic modeling language; and
   b. the solver software program is an optimization program that optimizes the objective function.

5. The method according to claim 2, wherein the logistical problem is a three dimensional (3D) seismic survey problem.

6. The method according to claim 5, wherein the 3D seismic survey problem is to minimize acquisition costs in the design and operations of the 3D seismic survey.

7. The method according to claim 6, wherein:
   a. in the identifying the decision variables step, the decision variables identified for the 3D seismic survey are selected from the group consisting of: number of shot locations, number of receiver locations, placement of shot locations, placement of receiver locations, number of active receiver lines, number of active receiver channels per line, coordination of the shot locations, and placement of equipment to receive a reflected signal; and
   b. in the building a mathematical model step, the objective function and set of constraints for minimizing acquisition costs comprise the steps of:
      i. modeling preparation costs;
      ii. shooting and recording costs; and
      iii. modeling processing costs.

8. The method according to claim 7, wherein the preparation costs comprise:
   a. permitting costs;
   b. surveying costs;
   c. cutting and clearing; and
   d. drilling costs.

9. The method according to claim 7, wherein the shooting and recording costs comprise:
   a. crew costs; and
   b. equipment costs.

10. The method according to claim 7, wherein the processing costs are a function of the size of the survey.

11. The method according to claim 7, wherein the constraints comprise:
    a. the geophysical requirements of fold, offset and azimuth;
    b. maximum number of shots per day; and
    c. maximum number of channels.

12. The method according to claim 2, wherein the logistical problem is routing a 3D seismic survey source crew through a plurality of nodes in a minimum period of time.

13. The method according to claim 12, wherein each node represents a rack which is a set of source locations on the same source line between two adjacent receiver lines.

14. The method according to claim 13, further comprising:
    a. identifying as decision variables the number of times the source crew passes from one node to another node;
    b. requiring the constraint that each node must be visited at least once; and
    c. requiring the constraint that each n ode must be departed at least once; and
    d. requiring the constraint that the number of visits and departures from a node must be equal.

15. The method according to claim 14, further comprising routing a plurality of source crews method the plurality of nodes.

16. T he method according to claim 15, further comprising:
    a. requiring the constraint that each rack must be visited at least once by one of the source crews;
    b. requiring the constraint that each source crew starts at a base camp location and returns to the base camp location; and
    c. minimizing the total cost of routing the plurality of source crews by solving for an optimal number of crews and their routes while equalizing the time for each source crew to be away from the base camp location.

17. The method according to claim 2, wherein the logistical problem is placing a recording station within a field of receiver locations such that the number of times the recording station must be moved to cover the field of receiver locations is minimized.

18. The method according to claim 17, further comprising:
    a. identifying the location of the recording station at each point in time as a decision variable; and
    b. requiring the constraint that each receiver location must be listened to at least once.

19. A system for modeling and optimizing logistical operations problems in land seismic survey operations, comprising:
    a. means for identifying decision variables under user control for a logistical problem;
    b. means for identifying geophysical and operational constraints for the logistical problem;
    c. means for quantifying problem parameters;
    d. means for building a mathematical model of the logistical problem, the model being expressed as an objective function subject to a set of inequalities representing the constraints, the objective function and constraints being expressed in terms of the decision variables and problem parameters; and
    e. means for optimizing the objective function and solving for the decision variables while satisfying the set of constraints to generate an optimal logistical problem solution.

20. A system according to claim 19, wherein the means for generating an optimal logistical problem solution further comprise:
    a. means for translating the mathematical model into a form suitable for solution by a solver software program; and
    b. means for using the solver software program to solve for the decision variables which satisfy the problem constraints and optimize the objective function.

21. A computer-implemented method of modeling and optimizing logistical operations problems in land seismic survey operations, the method comprising the steps of:
    a. identifying seismic survey decision variables for a logistical problem that can be optimized;
    b. determining problem parameters;
    c. identifying the seismic survey operational and geophysical constraints;

d. building a mathematical model of the logistical, the model being expressed as an objective function and a set of constraints in terms of the decision variables and problem parameters;

e. translating the mathematical model into a form suitable for solution by a solver; and f. solving the model to generate an optimal problem solution.

22. The method according to claim 21, wherein the logistical problem is routing a 3D seismic survey source crew between a plurality of nodes in a minimum period of time.

23. The method according to claim 21, further comprising:

a. routing a plurality of 3D seismic survey source crews between the plurality of nodes in a minimum period of time;

b. minimizing the total cost of the 3D seismic survey; and c. equalizing the total amount of time each source crew is deployed during the seismic survey.

24. The method according to claim 21, wherein the logistical operations problem is placing a recording station within a field of receiver stations such that the number of times the recording station must be moved to cover the field of receiver stations is minimized.

25. The method according to claim 21, wherein the logistical problem is determining an amount to purchase of an expendable item needed for equipment operations such that the amount of the expendable item is sufficient for survey operation with a minimal amount of the expendable item remaining after the survey operation is complete.

26. The method according to claim 25, wherein the expendable item is vehicle fuel.

27. The method according to claim 21, wherein the logistical problem is placing shot locations so as to minimize the cost of the seismic survey while satisfying the operational and geophysical constraints.

28. The method according to claim 27, wherein the constraints comprise:

a. placing the shot locations to achieve a minimum required fold coverage;

b. placing the shot locations so the locations fall within a minimum and maximum offset; and c. placing the shot locations so the locations fall within a minimum and maximum azimuth.

29. The method according to claim 27, wherein the problem parameters comprise:

a. cost of locating the shot location at a potential shot point; and b. a set of shot locations that shoot into a bin;

c. number of the shot locations in the bin that fall into a minimum and maximum offset;

d. minimum and maximum fold coverage for the bin that fall into the minimum and maximum offset;

e. a set of shot locations for the bin that fall into a minimum and maximum azimuth; and f. minimum and maximum fold coverage for the bin that fall into the minimum and maximum azimuth.

30. The method according to claim 21, wherein the logistical problem is placing shot locations and determining source crew routing so as to minimize seismic survey cost while satisfying the operational and geophysical constraints.

31. The method according to claim 30, further comprising placing the shot locations to avoid shot exclusion zones.

32. The method according to claim 31, wherein the shot exclusion zones are problem parameters determined by a user.

33. The method according to claim 31, wherein the shot exclusion zones are seismic survey operational and geophysical constraints.

34. The method according to claim 30, wherein the problem parameters comprise:

a. cost of placing the shot location at each shot point;

b. cost of a source crew traveling between the shot locations; and c. set of possible base camp locations.

35. The method according to claim 34, wherein the operational and geophysical constraints comprise:

a. placing the shot locations to achieve a minimum fold coverage;

b. placing the shot locations to fall within a minimum and maximum offset;

c. placing the shot locations to fall within a minimum and maximum azimuth;

d. requiring the source crew to enter the shot location at least once;

e. requiring number of visits to and departures from the shot locations to be equal; and f. allowing only one base camp to be selected from the set of possible base camp locations.

36. The method according to claim 30, wherein the logistical problem further comprises placing shot locations and determining source crew routing so the shot locations are offset from an exclusion zone in a completed survey design to avoid obstacles in the survey field.

37. The method according to claim 36, wherein the constraints comprise:

a. determining a set of offset shot locations for each location to be avoided in the completed survey design;

b. requiring at least one source crew to enter and leave each shot location;

c. for a plurality of source crews, equalizing the length of time for each source crew to visit the shot locations;

d. placing the shot locations to achieve a minimum fold coverage;

e. placing the shot locations so the locations fall within a minimum and maximum offset;

f. placing the shot locations so the locations fall within a minimum and maximum azimuth;

g. requiring number of visits to and departures from each shot location by the source crew to be equal; and h. allowing only one base camp to be selected from the set of possible base camp locations.

38. The method according to claim 30, wherein the logistical problem comprises optimizing shot location, vehicle routing and receiver equipment layout operational constraints.

39. A computer processor instructed to execute a computer program containing instructions causing a computer processor to model and optimize logistical operations problems in land seismic survey operations, the computer program comprising:

a) means for identifying decision variables under user control for a logistical problem;
b) means for identifying geophysical and operational constraints for the logistical problem;
c) means for quantifying variable problem parameters;
d) means for building a mathematical model of the logistical problem, the model being expressed as an objective function subject to a set of inequalities representing the constraints, the objective function being expressed in terms of the decision variables and problem parameters; and means for optimizing the objective function and solving for the decision variables while satisfying the set of constraints to generate an optimal logistical problem solution.

\* \* \* \* \*